US010585225B2

(12) United States Patent
Asahi et al.

(10) Patent No.: US 10,585,225 B2
(45) Date of Patent: Mar. 10, 2020

(54) TRANSPARENT FILM, POLARIZING PLATE, AND IMAGE DISPLAYING DEVICE

(71) Applicant: FUJIFILM Corporation, Tokyo (JP)

(72) Inventors: Miho Asahi, Kanagawa (JP); Ayako Matsumoto, Kanagawa (JP); Shuntaro Ibuki, Kanagawa (JP); Shinya Watanabe, Kanagawa (JP); Hajime Nakayama, Kanagawa (JP); Naoya Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 160 days.

(21) Appl. No.: 15/726,881

(22) Filed: Oct. 6, 2017

(65) Prior Publication Data

US 2018/0045870 A1    Feb. 15, 2018

Related U.S. Application Data

(63) Continuation of application No. PCT/JP2016/061627, filed on Apr. 8, 2016.

(30) Foreign Application Priority Data

Apr. 10, 2015 (JP) .................................. 2015-080879
Apr. 10, 2015 (JP) .................................. 2015-080880

(Continued)

(51) Int. Cl.
*G02B 5/30* (2006.01)
*G02B 27/28* (2006.01)
(Continued)

(52) U.S. Cl.
CPC ............ *G02B 5/3033* (2013.01); *B32B 27/00* (2013.01); *B32B 27/18* (2013.01); *B32B 27/22* (2013.01);
(Continued)

(58) Field of Classification Search
CPC ....... G02B 5/30; G02B 5/3025; G02B 5/3033; G02B 5/3038; G02B 1/14; G02B 1/105;
(Continued)

(56) References Cited

U.S. PATENT DOCUMENTS

2007/0237966 A1    10/2007    Takao et al.
2007/0242362 A1    10/2007    Takada et al.
(Continued)

FOREIGN PATENT DOCUMENTS

CN          101046520 A       10/2007
CN          103069307 A        4/2013
(Continued)

OTHER PUBLICATIONS

Office Action, issued by the State Intellectual Property Office dated Jan. 14, 2019, in connection with corresponding Chinese Patent Application No. 201680021024.2.
(Continued)

*Primary Examiner* — Mustak Choudhury
(74) *Attorney, Agent, or Firm* — Edwards Neils LLC; Jean C. Edwards, Esq.

(57) ABSTRACT

A transparent film includes: a base material; and at least one scratch resistant layer of which indentation hardness is 300 MPa or greater and of which a thickness is 50 to 1,000 nm on an outermost surface of the transparent film at one side or both sides of the base material, and a number of times of folding endurance of the transparent film measured by an MIT testing machine according to JIS P8115 (2001) is 1,000 times or greater.

20 Claims, 3 Drawing Sheets

(30) Foreign Application Priority Data

| | | | |
|---|---|---|---|
| Jul. 9, 2015 | (JP) | | 2015-137958 |
| Jul. 9, 2015 | (JP) | | 2015-137959 |
| Jan. 12, 2016 | (JP) | | 2016-003865 |

(51) Int. Cl.

| | |
|---|---|
| B32B 27/18 | (2006.01) |
| G09F 9/00 | (2006.01) |
| B32B 27/00 | (2006.01) |
| G02B 1/14 | (2015.01) |
| B32B 27/22 | (2006.01) |
| G02F 1/1335 | (2006.01) |
| C08J 7/04 | (2020.01) |

(52) U.S. Cl.
CPC ......... G02B 1/14 (2015.01); G02F 1/133528 (2013.01); G09F 9/00 (2013.01); C08J 7/04 (2013.01); G02B 5/3083 (2013.01); G02F 1/133502 (2013.01)

(58) Field of Classification Search
CPC .............. G09F 9/00; G02F 1/133502; G02F 1/133528; G03G 15/161; B32B 5/18; B32B 15/08; B32B 27/00; B32B 27/18; B32B 27/22; B32B 23/08; B32B 7/02; C08J 7/04; C08K 3/04; C08K 3/08; C08L 71/00
USPC ............ 359/483.01, 485.03; 428/138, 195.1, 428/209, 217; 427/97.3, 256, 532, 596; 399/308; 524/439, 495
See application file for complete search history.

(56) References Cited

U.S. PATENT DOCUMENTS

| | | | | |
|---|---|---|---|---|
| 2007/0282051 A1* | 12/2007 | Okano | ..................... | C08K 3/04 524/495 |
| 2013/0222907 A1* | 8/2013 | Inomata | ................. | B32B 23/08 359/483.01 |
| 2015/0302951 A1 | 10/2015 | Jung et al. | | |

FOREIGN PATENT DOCUMENTS

| | | | |
|---|---|---|---|
| CN | 104380394 | A | 2/2015 |
| JP | 05-8350 | A | 1/1993 |
| JP | 2004-155187 | A | 6/2004 |
| JP | 2008-242167 | A | 10/2008 |
| JP | 2009-042647 | A | 2/2009 |
| JP | 2014-102320 | A | 6/2014 |
| JP | 2014-104687 | A | 6/2014 |
| JP | 2014-152281 | A | 8/2014 |
| JP | 2014-201032 | A | 10/2014 |
| JP | 2014-206707 | A | 10/2014 |
| JP | 2014201032 | A * | 10/2014 |
| JP | 2016-099827 | A | 5/2016 |
| KR | 2011-0047596 | A | 5/2011 |

OTHER PUBLICATIONS

International Search Report issued in PCT/JP2016/061627 dated Jul. 5, 2016.
Written Opinion issued in PCT/JP2016/061627 dated Jul. 5, 2016.
International Preliminary Report on Patentability issued by WIPO dated Oct. 19, 2017, in connection with International Patent Application No. PCT/JP2016/061627.
Notification of Reason for Refusal issued by the Korean Intellectual Property Office dated Dec. 4, 2018, in connection with corresponding Korean Patent Application No. 10-2017-7028724.
Notification of Reasons for Refusal issued by the Japanese Patent Office dated Oct. 2, 2018, in connection with corresponding Japanese Patent Application No. 2017-511115.
Office Action, issued by the State Intellectual Property Office dated Sep. 9, 2019, in connection with corresponding Chinese Patent Application No. 201680021024.2.
Office Action, issued by the Japanese Patent Office dated Jun. 4, 2019, in connection with corresponding Japanese Patent Application No. 2017-511115.
Office Action issued by the Korean Intellectual Property Office dated Jul. 16, 2019, in connection with corresponding Korean Patent Application No. 10-2017-7028724.

* cited by examiner

TRANSPARENT FILM, POLARIZING PLATE, AND IMAGE DISPLAYING DEVICE

CROSS-REFERENCE TO RELATED APPLICATIONS

This is a continuation of International Application No. PCT/JP2016/061627 filed on Apr. 8, 2016, which was published under Article 21(2) in Japanese, and which claims priority under 35 U.S.C. § 119(a) from Japanese Patent Application No. 2015-080879 filed on Apr. 10, 2015, Japanese Patent Application No. 2015-080880 filed on Apr. 10, 2015, Japanese Patent Application No. 2015-137958 filed on Jul. 9, 2015, Japanese Patent Application No. 2015-137959 filed on Jul. 9, 2015 and Japanese Patent Application No. 2016-003865 filed on Jan. 12, 2016. The above applications are hereby expressly incorporated by reference in their entirety, into the present application.

BACKGROUND OF THE INVENTION

1. Field of the Invention

The present invention relates to a transparent film, a polarizing plate, and an image displaying device.

2. Description of the Related Art

For requirements for resistance to an operation of a touch panel or pen input or for protection of a display portion, thin and hard glass such as chemically strengthened glass is often used on surfaces of mobile displays such as smart phones and tablets. Although glass basically has hard characteristics, it has a problem that it is heavy and easily broken.

In a case where there is a plastic film as hard and transparent as glass, the plastic film has an advantage of being light and unbroken, and thus various plastic films are suggested. For example, there is suggested a film having transparency, surface hardness, and scratch resistance as excellent as glass by coating a surface of a transparent resin film with a hard coat layer (JP2014-152281A).

Recently, though demands for flexible display have increased, flexibility is low in the related art, and thus it is not appropriate for the protection of the surface of a flexible display. A film having a surface with high transparency, excellent scratch resistance, and excellent resistance to repetitive bending is strongly required. Accordingly, compatibility between scratch resistance and resistance to repetitive bending by providing an acrylic resin layer having a high molecular weight on the surface of a cyclic olefin resin film is required (JP2014-104687A).

However, levels of the scratch resistance and the resistance to repetitive bending are low, and requirements of the market are not satisfied.

SUMMARY OF THE INVENTION

An object of the present invention is to provide a transparent film having excellent scratch resistance and having excellent resistance to repetitive bending, and also having excellent pencil hardness and appropriate for flexible display.

That is, the above object can be achieved by the following configurations.

<1>
A transparent film including: a base material; and at least one scratch resistant layer of which indentation hardness is 300 MPa or greater and of which a thickness is 50 to 1,000 nm, on an outermost surface of the transparent film at one side or both sides of the base material, in which the number of times of folding endurance of the transparent film measured by an MIT testing machine according to ES P8115 (2001) is 1,000 times or greater.

<2>
The transparent film according to <1>, in which the scratch resistant layer includes fine particles of which an average primary particle diameter is 100 nm to 1,000 nm and of which indentation hardness is 400 MPa or greater, and a binder resin.

<3>
The transparent film according to <1>, in which the scratch resistant layer includes fine particles having indentation hardness of 400 MPa or greater and having a polygonal surface, and a binder resin,
in which the particle size of the fine particles is 100 nm to 1,000 nm in a case where the particle size of the fine particles is converted into a diameter of a virtual circle having a smallest area among the virtual circles which pass through arbitrary two vertices of a projection portion obtained by projecting the polygonal surface of the fine particles in a direction in which a projection area becomes maximum and include the projection portion within the virtual circles, and
in which the fine particles at least exist in an outermost surface area of the transparent film.

<4>
The transparent film according to <1>, in which the scratch resistant layer contains a cured product of a crosslinking compound in which the number of crosslinking groups in one molecule is 3 or more by 80 mass % or greater with respect to a total mass of the scratch resistant layer and a relaxation layer is provided between the scratch resistant layer and the base material.

<5>
The transparent film according to <2> or <3>, in which a shortest distance between end portions of the adjacent fine particles in an outermost surface of the transparent film is 1 nm to 12 μm.

<6>
The transparent film according to <2>, in which a dispersion degree of an average primary particle diameter of the fine particles is 10% or less.

<7>
The transparent film according to <3>, in which a thickness of the base material is 50 μm or less, in a case where a fine particle having the polygonal surface is sandwiched between the virtual circle and a virtual plane parallel to the virtual circle, and a distance between the virtual circle and the virtual plane is defined as a thickness of the fine particle, the thickness of the fine particle is 50% or less of a thickness of the scratch resistant layer, the fine particles are unevenly distributed on the outermost surface area of the transparent film, and a ratio of an area occupied by the fine particles to an area of the outermost surface of the transparent film is 30% or greater.

<8>
The transparent film according to any one of <1> to <7>, in which the transparent film has resistance to repetitive bending in which the number of times of folding endurance measured by an MIT testing machine according to JIS P8115 (2001) is 10,000 times or greater.

<9>

The transparent film according to any one of <1> to <8>, in which a haze measured based on JIS-K7136 (2000) is 2.0% or less.

<10>

The transparent film according to any one of <1> to <3>, further including a relaxation layer between the scratch resistant layer and a transparent base material.

<11>

The transparent film according to <10>, in which indentation hardness of the relaxation layer is smaller than indentation hardness of the scratch resistant layer.

<12>

A polarizing plate including the transparent film according to any one of <1> to <11> on an outermost surface.

<13>

A polarizing plate including: the transparent film according to any one of <1> to <11> on an outermost surface; a polarizer; and a transparent base material having resistance to repetitive bending in which the number of times of folding endurance measured by an MIT testing machine according to JIS P8115 (2001) is 1,000 times or greater, on an opposite surface with the polarizer therebetween.

<14>

An image displaying device including: the transparent film according to any one of <1> to <11>; and the polarizing plate according to <12> or <13>.

<15>

An image displaying device including: the transparent film according to any one of <1> to <11> on an outermost surface on a viewing side; and a scratch resistant layer which is the same as the scratch resistant layer on an outermost surface opposite to the viewing side.

According to the present invention, it is possible to provide a transparent film having excellent rub resistance, excellent resistance to bending, and excellent pencil hardness.

DESCRIPTION OF THE PREFERRED EMBODIMENTS

Figure 1:
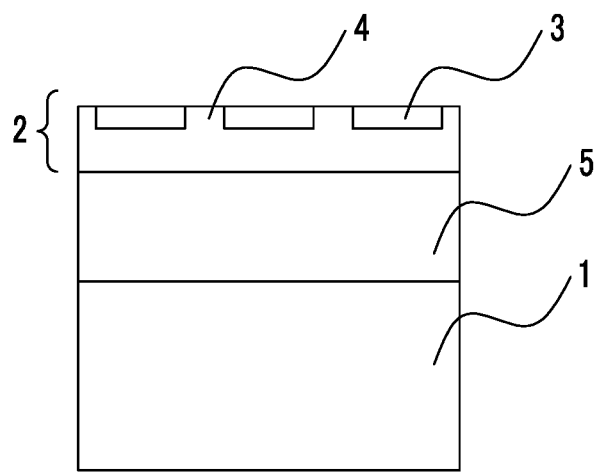
FIG. 1 is a diagram schematically illustrating an example of a preferable embodiment of a transparent film according to the present invention.

The present invention is specifically described below.

The description of requirements described below is provided based on representative embodiments of the present invention, but the present invention is not limited to the embodiments.

In the present specification, a numerical range described by using "to" means a range including numerical values provided before and after "to" as a lower limit and an upper limit.

"(Meth)acrylate" represents at least one of acrylate and methacrylate, "(meth)acryl" represents at least one of acryl and methacryl, and "(meth)acryloyl" represents at least one of acryloyl and methacryloyl.

A transparent film of the present invention is a transparent film having a scratch resistant layer of which indentation hardness of at least one layer is 300 MPa or greater, of which a thickness is 50 to 1,000 nm, on an outermost surface of the transparent film at one side or both sides of a base material, and the transparent film is a transparent film in which the number of times of folding endurance measured by an MIT testing machine according to Japanese Industrial Standards (JIS) P8115 (2001) is 1,000 times or greater.

The transparent film according to the present invention preferably has a total light of visible light (wavelength of 380 to 780 nm) of 80% or greater.

The transparent film of the present invention preferably has rub resistance at a level or greater at which scratches are not generated by a steel wool scratch test with a load of 250 g.

The transparent film of the present invention is preferably scratched by a 2H pencil hardness test, and scratch marks disappear after one hour has elapsed under an environment of 25° C. and a relative humidity of 60%.

With respect to the transparent film according to the present invention, it is preferable that scratch marks are not seen after a 2H pencil hardness test, and it is more preferable that scratch marks are not seen after a 4H pencil hardness test.

The transparent film according to the present invention preferably has resistance to repetitive bending in which the number of times of folding endurance measured by an MIT testing machine according to JIS P8115 (2001) is 10,000 times or greater.

With respect to the transparent film according to the present invention, it is preferable that haze measured based on JIS-K7136 (2000) is 2.0% or less.

{Scratch Resistant Layer}

The scratch resistant layer of the present invention is required to have indentation hardness of 300 MPa or greater and to be a thin layer. It is possible to suppress scratches of a flexible transparent film by covering an outermost surface with a layer having a high degree of hardness. The indentation hardness of the scratch resistant layer is preferably 350 MPa or greater and more preferably 400 MPa or greater. The indentation hardness can be measured by a nanoindenter or the like. As a specific measuring method, in a case where the indentation hardness is measured in the range of push depth of 1/10 or less of a scratch resistant layer thickness on the surface side of the scratch resistant layer, the influence of the hardness of the base material is hardly received, hardness of the scratch resistant layer can be accurately measured, and thus the measurement is preferable.

If the scratch resistant layer is a thin layer, in a case where the scratch resistant layer is folded such that the transparent film is inside the scratch resistant layer or the scratch resistant layer is outside, the curvature difference between an outermost surface (a surface opposite side to the surface on the base material side) of the scratch resistant layer and a surface (an interface with the base material) on the base material side becomes short, the outermost surface does not break or peel off from the surface on the base material side. As a result, it is possible to obtain a film that is hard and bends without scratching.

The transparent film of the present invention is preferably any one form of Forms A to C.

Form A: A transparent film in which a scratch resistant layer includes fine particles having an average primary particle diameter of 100 nm to 1,000 nm and indentation hardness of 400 MPa or greater, and a binder resin.

Form B: A transparent film in which a scratch resistant layer includes fine particles having indentation hardness of 400 MPa or greater and having a polygonal surface, and a binder resin, in which the particle size of the fine particles is 100 nm to 1,000 nm in a case where the particle size of the fine particles is converted into a diameter of a virtual circle having a smallest area among the virtual circles which pass through arbitrary two vertices of a projection portion obtained by projecting the polygonal surface of the fine particles in a direction in which a projection area becomes maximum and include the projection portion within the virtual circles, and in which the fine particles at least exist in an outermost surface area of the transparent film.

Form C: A transparent film in which the scratch resistant layer contains a cured product of a cross-linking compound in which the number of crosslinking groups in one molecule is 3 or more by 80 mass % or greater with respect to a total mass of the scratch resistant layer, and a relaxation layer is provided between the scratch resistant layer and the base material.

Figure 2:
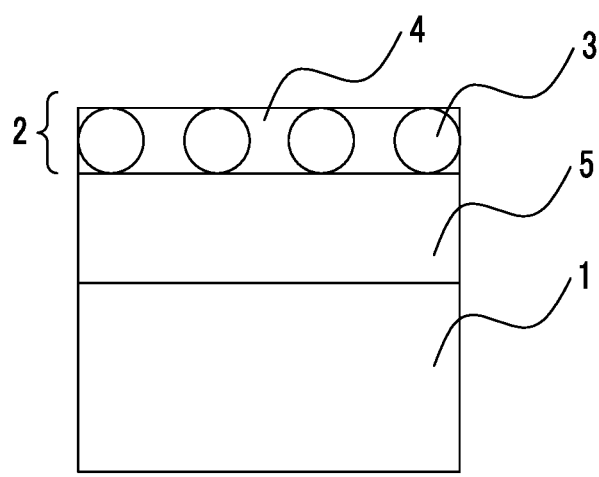
FIG. 2 is a diagram schematically illustrating an example of another preferable embodiment of the transparent film according to the present invention.

An example of a preferable embodiment of Form A of the transparent film according to the present invention is illustrated in FIG. 2.

An example of a preferable embodiment of Form B of the transparent film according to the present invention is illustrated in FIG. 1.

Figure 3:
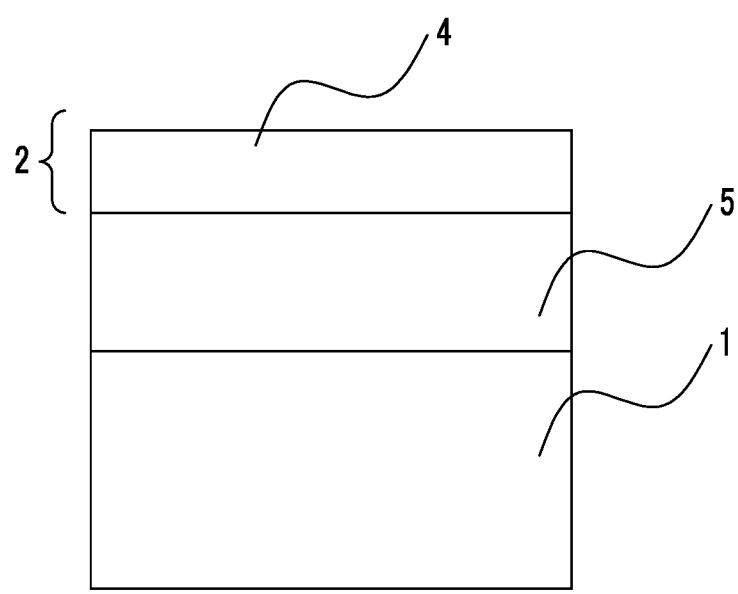
FIG. 3 is a diagram schematically illustrating an example of still another preferable embodiment of the transparent film according to the present invention.

An example of a preferable embodiment of Form C of the transparent film according to the present invention is illustrated in FIG. 3.

<Form A>

First, the transparent film of Form A is described below.

The transparent film of Form A is a transparent film having a scratch resistant layer including fine particles having an average primary particle diameter of 100 nm to 1,000 nm and indentation hardness of 400 MPa or greater, and a binder resin at one side or both sides of the base material.

The transparent film of Form A has a scratch resistant layer including hard fine particles having indentation hardness of 400 MPa or greater and a binder resin, and the fine particles at least exist in an outermost surface area of the transparent film. It is preferable that a plurality of fine particles penetrating from the outermost surface area of the transparent film to an interface area between the scratch resistant layer and the base material exist in the scratch resistant layer. Accordingly, a portion in which the fine particles exist serves as a hard column and supports the film such that scratching of the film can be suppressed. Since an elongation percentage of the binder resin is high (flexibility is high), in a case where the film is bent such that the scratch resistant layer is inside or the scratch resistant layer is outside, portions in the scratch resistant layer other than the fine particles significantly expand and contract, and thus the scratch resistant layer does not break or is not peeled off from the base material. As a result, it is possible to obtain a film that is hard and bends (excellent resistance to bending).

{Scratch Resistant Fine Particle Layer}

The scratch resistant layer of Form A contains fine particles. The scratch resistant layer containing the fine particles is called a "scratch resistant fine particle layer".

In order to provide sufficient scratch resistance to the transparent film such that the scratch resistant fine particle layer does not break or is not peeled off from the base material even in a case of repetitive folding, the film thickness of the scratch resistant fine particle layer is preferably 50 nm to 1,000 nm, more preferably 60 nm to 800 nm, and even more preferably 70 nm to 500 nm. In a case where the binder resin is a material extremely excellent in resistance to bending, the film can also be designed to be thicker, and a portion that is recessed after the pencil hardness test becomes as it has been as the time has elapsed, such that an evaluation of no scratches can be obtained in the pencil hardness test. The evaluation of the pencil hardness test is preferably H or harder, more preferably 2H or harder, and most preferably 3H or harder.

[Fine Particles]

The fine particles of the scratch resistant fine particle layer are described.

It is preferable that the fine particles of the scratch resistant fine particle layer are evenly spread in a high filling ratio, in order to improve the scratch resistance. It is important that the filling ratio is not too high. In a case where the filling ratio is too high, an amount of the binder resin having a high elongation percentage becomes too small, elasticity of matrices (scratch resistant fine particle layer) becomes weak, and resistance to bending decreases. In this point of view, the distribution of the fine particles is preferably adjusted such that the fine particles are even on the entire scratch resistant fine particle layer.

The fine particles at least exist in an outermost surface area of the transparent film. The outermost surface area of the transparent film represents an area of 20 to 100 nm from the most outside on the opposite side of the base material of the transparent film. It is preferable that a plurality of fine particles penetrating from the outermost surface area of the transparent film to the interface area between the scratch resistant layer and the base material exist in the scratch resistant layer. The interface area between the scratch resistant layer and the base material represent an area of 20 to 100 nm from the interface. Since hard particles exist as columns in this area, it is possible to cause the entire transparent film to be hardly scratched.

The shortest distance (interparticle distance) between end portions of adjacent fine particles existing in this area can be obtained by observing a medium acceleration voltage (10 kV and the like) from the surface by a scanning electron microscope (SEM). The interparticle distance can be calculated preferably as an average value in a case where the distances between end portions of the adjacent fine particles are measured at 100 points or more, more preferably as an average value in a case where the distances between end portions of the adjacent fine particles are measured at 300 points or more, and even more preferably as an average value in a case where the distances between end portions of the adjacent fine particles are measured at 500 points or more.

The interparticle distance is preferably 1 nm to 12 more preferably 5 nm to 5 μm, and even more preferably 10 nm to 1 μm.

In a case where the fine particles exist in the outermost surface area of the transparent film and the interparticle distance is 12 μm or less, the interparticle distance becomes smaller than a fiber diameter of steel wool #0000 which is a representative example for evaluating scratch resistance of the surface film, the fine particles are rubbed in a case where rubbing is performed, and thus scratches are not generated in the surface film. In a case where the interparticle distance is 1 nm or greater, the binder resin expands and contracts in a case of being folded, the resistance to bending can be sufficiently provided to the entire scratch resistant fine particle layer.

With respect to the fine particles, the average primary particle diameter is 100 nm to 1,000 nm, and the indentation hardness is 400 MPa or greater.

The reason that it is preferable that the average primary particle diameter is 100 nm or greater is not clear, but it is assumed that hard portions (portions in which fine particles exist) and highly elastic portions (portions in which fine particles do not exist) independently function in the layer, and thus the surface hardness and the expansion can become compatible. In a case where the average primary particle diameter is 1,000 nm or less, it is preferable since the fine particles fall off in a case where the film is bent or the breakage hardly occurs in the interface between the fine particles and the binder. The cloudiness of the film is hardly generated due to the light scattering, and thus the cloudiness is preferable in view of increasing the transparency.

The dispersion degree (Cv value) of the average primary particle diameter of the fine particles is preferably 10% or less, more preferably 8% or less, even more preferably 6% or less, and particularly preferably 4% or less.

The Cv value is a value (unit: %) that can be obtained by Equation (10).

$$Cv\ \text{value} = ([\text{Standard deviation of average primary particle diameter}]/[\text{average particle diameter}]) \times 100 \quad (10)$$

As the value is smaller, it means that the average primary particle diameters are uniform. The average primary particle diameter is measured by using a scanning electron microscope (SEM). The average particle diameter of the fine particles and the standard deviation thereof are calculated based on measured values of the particle diameters of the 200 or more fine particles. Also in a case of a mixture of a plurality of kinds of particles having different average primary particle diameters, a Cv value of the entire particles is calculated.

If the Cv value is 10% or less, in a case where the film thickness of the scratch resistant fine particle layer is close to or a little bit smaller than the average primary particle diameter of the fine particles, the height of the fine particles protruding from the scratch resistant fine particle layer can be caused to be uniform. Therefore, the film thickness is particularly preferable in view of causing the scratch resistance to be satisfactory. In a case where the film thickness of the scratch resistant fine particle layer is thicker than the average primary particle diameter of the fine particles, the frequency of the fine particles existing in the outermost surface area can be caused to be even in the entire film by causing the Cv value to be in this range. Therefore, the film thickness is preferable.

The indentation hardness of the fine particles is 400 MPa or greater, preferably 450 MPa or greater, and more preferably 550 MPa or greater. In order to cause the film not to be fragile and easily broken, the indentation hardness of the fine particles is preferably 10,000 MPa or less.

The indentation hardness of the fine particles can be measured by a nanoindenter or the like. In a specific measuring method, the fine particles are arranged on a substrate (glass plate, quartz plate, and the like) which is harder than the fine particles such that the fine particles are not overlapped such that one or more steps are generated (such that a plurality of metal oxide particles do not exist in a direction orthogonal to the surface of a substrate), the indentation hardness can be measured by pushing specimens with a diamond indenter. At this point, the fine particles are preferably fixed with a resin or the like such that the fine particles do not move. Here, in a case where the fine particles are fixed with a resin, the fixing is performed such that a portion of the fine particles is exposed. It is preferable that the pushed position is specified with a triboindenter.

According to the present invention, a specimen in which fine particles are arranged on a substrate and the fine particles are bonded and fixed by using a small amount of a curable resin so as not to give influence on a measured value is formed, and indentation hardness of the fine particles is obtained by using this specimen and a measuring method by an indenter.

As the fine particles, fine particles with any kinds of materials can be used without departing from the gist of the present invention. However, metal oxide fine particles can be particularly preferably used. Examples of the metal oxide particle include diamond powder, sapphire particles, boron carbide particles, silicon carbide particles, alumina particles, zirconia particles, titania particles, antimony pentoxide particles, and silica particles. However, since it is easy to cause the average primary particle diameter to be 100 nm or greater and the Cv value to be 10% or less, alumina particles and silica particles are preferable.

In order to cause the fine particles to be hard, specifically, to cause the indentation hardness to be 400 MPa or greater, the fine particles may be calcined particles, and, for example, calcined silica particles are preferable.

The calcined silica particles can be manufactured by a well-known technique of obtaining silica particles by hydrolyzing and condensing a hydrolyzable silicon compound in an organic solvent including water and a catalyst and calcining the silica particles. That is, for example, JP2003-176121A and JP2008-137854A can be referred to.

The silicon compound as a raw material for manufacturing the calcined silica particles is not particularly limited. However, examples thereof include a chlorosilane compound such as tetrachlorosilane, methyltrichlorosilane, phenyltrichlorosilane, dimethyldichlorosilane, diphenyldichlorosilane, methyl vinyl dichlorosilane, trimethylchlorosilane, and methyldiphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino) propyltrimethoxysilane, phenyltrimethoxysilane, phenyl triethoxysilane, dimethyl dimethoxysilane, dimethyl diethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyl triacetoxysilane, phenyl triacetoxysilane, dimethyl diacetoxysilane, diphenyl diacetoxysilane, and trimethylacetoxysilane; and a silanol compound such as dimethylsilanediol, diphenylsilanediol, and trimethylsilanol. Among the silane compounds exemplified above, alkoxysilane compounds are particularly preferable since alkoxysilane compounds are more easily obtained, and halogen atoms are not contained as impurities in the obtained calcined silica particles. In a preferable form of the calcined silica particles according to the present invention, it is preferable that the content of halogen atoms is substantially 0%, and halogen atoms are not detected.

The calcining temperature is not particularly limited. However, the calcining temperature is preferably 800° C. to 1,300° C. and more preferably 1,000° C. to 1,200° C.

The calcined silica particles are preferably calcined silica particles which are surface-modified with a compound having a (meth)acryloyl group. In a case where the calcined silica particles surface-modified with a compound having a (meth)acryloyl group are used, effects such as improvement in dispersibility in a composition for forming a scratch resistant fine particle layer, improvement in film hardness, and aggregation prevention can be expected. As the specific examples and preferable examples of the surface treatment method, disclosure in [0119] to [0147] of JP2007-298974A can be referred to.

In order to cause the fine particles to be harder and to be particles having higher indentation hardness, high purity alumina particles and the like are preferable. As specific examples of the high purity alumina particle and the manufacturing method thereof, disclosures of [0008] to [0060] in JP1995-206432A (JP-H07-206432A) can be referred to.

In the same manner as the calcined silica particles, the alumina particles are preferably alumina particles surface-modified with a compound having a (meth)acryloyl group. The compound having a (meth)acryloyl group is preferably a silane coupling agent having a (meth)acryloyl group. The surface treatment is preferably a silane coupling treatment.

In a case where alumina particles surface-modified with a compound having a (meth)acryloyl group are used, the alumina particles are crosslinked with a (meth)acryloyl group in the binder resin, the alumina particles are strongly fixed to the binder resin, the pencil hardness of the obtained scratch resistant fine particle layer further increases, alumina particles hardly fall off even in a case of folding, and thus the alumina particles are preferable. As specific examples of the surface treatment method and the preferable examples thereof, disclosure in [0119] to [0147] of JP2007-298974A can be referred to.

Shapes of the fine particles may be shapes other than a spherical shape such as an irregular shape, but a spherical shape is most preferable.

As the fine particles, fine particles that are commercially available may be used. Specific examples thereof include PM100 (average primary particle diameter of about 100 nm, diamond manufactured by Tomei Diamond Co., Ltd.), PM1000 (average primary particle diameter of about 1,000 nm, diamond manufactured by Tomei Diamond Co., Ltd.), DENKA ASFP-20 (average primary particle diameter of 200 nm, alumina manufactured by Nihon Anodizing Co., Ltd.), AA-03 (average primary particle diameter of 300 nm, α-alumina single crystal manufactured by Sumitomo Chemical Company Limited), AA-04 (average primary particle diameter of 400 nm, α-alumina single crystal manufactured by Sumitomo Chemical Company Limited), AA-07 (average primary particle diameter of 700 nm, α-alumina single crystal manufactured by Sumitomo Chemical Company Limited), AKP-20 (average primary particle diameter of 200 nm, high purity α-alumina manufactured by Sumitomo Chemical Company Limited), AKP-50 (average primary particle diameter of 500 nm, high purity α-alumina manufactured by Sumitomo Chemical Company Limited), AKP-3000 (average primary particle diameter of 500 nm, high purity α-alumina manufactured by Sumitomo Chemical Company Limited), SEAHOSTAR KE-S30 (average primary particle diameter of 300 nm, calcined product of amorphous silica manufactured by Nippon Shokubai Co., Ltd.).

As the fine particles, commercially available particles may be calcined to be used. Specific examples thereof include SNOWTEX MP-1040 (average primary particle diameter of 100 nm, silica manufactured by Nissan Chemical Industries, Ltd.), SNOWTEX MP-2040 (average primary particle diameter of 200 nm, silica manufactured by Nissan Chemical Industries, Ltd.), SEAHOSTAR KE-P20 (average primary particle diameter of 200 nm, amorphous silica manufactured by Nippon Shokubai Co., Ltd.), and HIPRESICA FR (average primary particle diameter of 200 nm, amorphous silica manufactured by Ube Exsymo Co., Ltd.).

A formulation amount of the fine particles is preferably 5 volume % to 70 volume % with respect to the total solid content of the scratch resistant fine particle layer. In a case where the formulation amount is the lower limit or greater, hardness effective for scratch resistance can be provided, and in a case where the formulation amount is the upper limit or less, the expansion of the scratch resistant fine particle layer is satisfactory and resistance to repetitive bending is excellent. The adhesiveness to the base material is also preferable.

[Binder Resin of Scratch Resistant Fine Particle Layer]

If the scratch resistant fine particle layer includes a binder resin, in a case where the transparent film is bent such that the scratch resistant fine particle layer becomes inside or the scratch resistant layer becomes outside, the transparent film can be significantly expanded and contracted, the scratch resistant fine particle layer does not break or is not peeled off from the base material, and thus the transparent film can be excellent in the resistance to bending. In a case where the elasticity of the binder resin is extremely excellent, a portion that is indented after the pencil hardness test can return to the original after the time elapses, and the evaluation of no scratches can be obtained in the pencil hardness test.

Any kinds of materials may be used as the binder resin, without departing from the gist of the present invention. However, a urethane-based polymer, a silicone-based polymer, a polyrotaxane-based polymer, a rubber-based polymer, and an elastomer are preferable since elasticity is excellent, and flexibility can be provided. In this point of view, the binder resin may be a material which is the same as the base material. The binder resin may have a crosslinkable group that can be crosslinked by light or heat. Examples thereof include a group having an ethylenically unsaturated double bond, an epoxy group, and a hydrolyzable silyl group. In a case where the binder resin has these groups, hardness can be provided to the binder resin, and the scratch resistance can be increased. Here, in a case where the crosslinking density of the binder resin is too high, the elasticity declines, and thus the crosslinkable group is preferably used in the range in which the resistance to bending is not deteriorated. Examples of the commercially available product having a group having an ethylenically unsaturated double bond in a rubber-based polymer/oligomer include BAC-45 (polybutadiene terminal diacrylate, manufactured by Osaka Organic Chemical Industry Ltd.) and SPBDA-S 30 (hydrogenated polybutadiene terminal diacrylate, manufactured by Osaka Organic Chemical Industry Ltd.).

As the binder resin, a crosslinkable polymer/oligomer may be formulated in the above polymer to be used. Fine particles having high elasticity may be formulated in the crosslinkable polymer/oligomer. As the crosslinkable polymer/oligomer, urethane-based acrylate, silicone-based acrylate, alkylene oxide-modified acrylate, and the like can be widely used. As the fine particles having high elasticity, resin particles such as acrylic particles, and rubber-based particles can be used. Particularly, hybrid particles having a rubber-based polymer in a core and an acrylic resin in a shell are excellent in elasticity and compatibility and thus preferable. Examples of the commercially available particles having high elasticity include M-210 (average primary particle diameter of 200 nm, shell: polymethyl methacrylate, core: a copolymer of butyl acrylate and styrene, manufactured by Kaneka Corporation), M-711 (average primary particle diameter of 100 nm, shell: a copolymer of methyl methacrylate and butyl acrylate, core: a copolymer of butadiene and styrene, manufactured by Kaneka Corporation), and M-732 (average primary particle diameter of 60 nm, shell: a copolymer of methyl methacrylate, butyl acrylate, and styrene, core: a butadiene polymer, manufactured by Kaneka Corporation).

As the binder resin in the scratch resistant fine particle layer, a cured product of a cross-linking compound in Form C described below in which the number of crosslinking groups in one molecule is 3 or greater may be included. With respect to the cross-linking compound in which the number of crosslinking groups in one molecule is 3 or greater is as described in Form C.

In Form A, the content of the cured product of the cross-linking compound in which the number of crosslinking groups in one molecule is 3 or greater is preferably 5 mass % or greater, more preferably 10 mass % or greater, and even more preferably 15 mass % or greater with respect to the total mass of the scratch resistant fine particle layer.

[Refractive Index of Fine Particles and Binder Resin of Scratch Resistant Fine Particle Layer]

In order to obtain transparency of the film, it is important not to generate haze in the scratch resistant fine particle layer. For this reason, the refractive indexes of the fine particles and the binder resin are as close as possible. As the fine particles, a material having a refractive index of about 1.40 to 2.80 is preferably used in a large amount. As the binder resin, a material having a refractive index of about 1.40 to 1.65 is preferably used in a large amount.

[Other Components]

In addition to the component, various additives such as an antistatic agent, a leveling agent, a sensitizer, and a refractive index adjusting agent may be contained in the scratch resistant fine particle layer, without departing from the gist of the present invention.

(Antistatic Agent)

As the antistatic agent, a well-known antistatic agent in the related art such as a quaternary ammonium salt-based polymer, a π-conjugated polymer, and conductive inorganic fine particles may be used. However, particularly in a case of conductive inorganic fine particles, it is likely that the elasticity of the scratch resistant fine particle layer is significantly changed, an organic material is more preferable.

(Leveling Agent)

If a leveling agent is used in a case of forming the scratch resistant fine particle layer, for example, stability of the film surface in a case of forming or drying the film such as casting and coating can be provided, and lubricity and antifouling properties can be provided to the surface of the completed scratch resistant fine particle layer. Particularly in a case where lubricity is provided, the scratch resistance is improved, and thus the lubricity is preferable. As the specific examples of the leveling agent, the well-known leveling agent in the related art such as fluorine-based or silicone-based leveling agents can be used. As specific examples of the leveling agent and preferable examples thereof, fluorine-based leveling agents and silicone-based leveling agents disclosed in [0012] to [0101] of JP2012-88699A can be referred to.

(Refractive Index Adjusting Agent)

In a case where the refractive indexes of the fine particles and the binder resin do not match with each other and the transparency decreases, the refractive index adjusting agent can be added for the purpose of controlling the refractive index of the scratch resistant fine particle layer without departing from the gist of the present invention. As the refractive index adjusting agent, general purpose refractive index adjusting agents such as a high refractive index organic compound such as fluorene, a low refractive index organic compound such as a fluorine-based compound, high refractive index inorganic particles such as zirconia and titania, and low refractive index particles such as silica and hollow resin particles may be used. In a case where particles are used as the refractive index adjusting agent, particles having an average primary particle diameter of less than 100 nm are preferable since the above effect of improving the scratch resistance by the fine particles having the average primary particle diameter of 100 nm or greater is not deteriorated. In a case where the particles are used, it is likely that the elasticity of the binder resin is significantly changed, and thus an organic material is more preferable.

[Method of Forming Scratch Resistant Fine Particle Layer]

The scratch resistant fine particle layer is preferably formed by using a composition for forming the scratch resistant fine particle layer. Particularly, it is preferable to form the scratch resistant fine particle layer by coating a base material with the composition for forming the scratch resistant fine particle layer.

The composition for forming the scratch resistant fine particle layer can be prepared by dissolving or dispersing the above respective components in the scratch resistant fine particle layer in a solvent. The composition for forming the scratch resistant fine particle layer may further contain a polymerization initiator.

(Polymerization Initiator)

In a case where the scratch resistant fine particle layer is formed, radical and cation polymerization initiators may be appropriately selected to be used, if necessary. These polymerization initiators are decomposed by light irradiation and/or heating so as to generate radicals or cations, radical polymerization and cationic polymerization proceed.

(Solvent)

As the solvent used in the composition for forming the scratch resistant fine particle layer, since it is possible to perform the functional separation in which (1) the dispersibility of the fine particles is preferable, (2) the base material can be swelled or dissolved, and (3) the base material is not swelled nor dissolved, at least two or more kinds of solvents are preferably used in combination. In a case where the dispersibility of the fine particles is satisfactory, an aggregate in which a binder resin does not exist between the fine particles is hardly formed, and the resistance to bending is improved. In a case where the solvent that swells or dissolves the base material is used, an area in which a binder resin permeates between the scratch resistant fine particle layer and the base material is formed, such that adhesion can be provided. In a case where a solvent that does not swell or dissolve the base material but that can dissolve the binder resin is used, a permeation amount of the binder resin to the base material can be adjusted, and thus the thickness of the scratch resistant fine particle layer can be controlled. As the specific example of the solvent used in the scratch resistant fine particle layer of the present invention and the preferable examples thereof, disclosure in [0032] to [0043] of JP2012-93723A can be referred to.

In a case where a triacetyl cellulose film is used as the base material, examples of the solvent having solubility to the base material include methyl acetate, acetone, and methylene chloride. Among these, in view of suppression of interference unevenness due to the formation of a gradation area (an area in which a binder resin permeated, and the concentration of the binder resin continuously decreases from the scratch resistant fine particle layer to the base material), methyl acetate and acetone are preferable. In a case where an aramid film is used as the base material, examples of the solvent having solubility include N-methyl-2-pyrrolidone containing 5 mass % of lithium bromide as a coating aid or N-methyl-2-pyrrolidone not containing a coating aid disclosed in [0044] to [0046] of JP5699454B.

{Base Material}

The base material of the transparent film according to the present invention preferably includes a polymer resin and a softening material that satisfies Expression (1).

$$N(10) \geq 1.1 \times N(0) \quad \text{Expression (1)}$$

Here, N(10) is the number of times of folding endurance of the base material including 10 parts by mass of a softening material with respect to the 100 parts by mass of the polymer resin, and N(0) is the number of times of folding endurance of the base material consisting of the polymer resin.

The base material of the transparent film according to the present invention may be produced from a single polymer resin without including the softening material and it is desired that the number of times of folding endurance is significant.

(Polymer Resin)

As the polymer resin, a polymer which is excellent in optical transparency, mechanical strength, and heat stability is preferable. In a case where the number of times of folding endurance is in the range of satisfying Expression (1), the number of times of folding endurance is not particularly limited, and any kinds of materials may be used.

Examples thereof include a polyester-based polymer such as a polycarbonate-based polymer, polyethylene terephthalate (PET), and polyethylene naphthalate (PEN), an acrylic polymer such as polymethyl methacrylate (PMMA), and a styrene-based polymer such as polystyrene and an acrylonitrile.styrene copolymer (AS resin). Examples thereof include polyolefin such as polyethylene and polypropylene, a polyolefin-based polymer such as a norbornene-based resin and an ethylene/propylene copolymer, an amide-based polymer such as a vinyl chloride-based polymer, nylon, and aromatic polyamide, an imide-based polymer, a sulfone-based polymer, a polyethersulfone-based polymer, a polyetheretherketone-based polymer, a polyphenylene sulfide-based polymer, a vinylidene chloride-based polymer, a vinyl alcohol-based polymer, a vinyl butyral-based polymer, an allylate-based polymer, a polyoxymethylene-based polymer, an epoxy-based polymer, a cellulose-based polymer represented by triacetyl cellulose, a copolymer of the above polymers, and a polymer obtained by mixing the above polymers.

Particularly, the amide-based polymer such as an aromatic polyamide has a significant number of times of folding endurance and comparatively high hardness, and thus can be preferably used as the base material. For example, the aromatic polyamide as in Example 1 disclosed in JP5699454B can be preferably used as the base material.

The base material of the transparent film can be formed as a cured layer of a thermosetting resin and an ultraviolet curable resin such as acrylic, urethane-based, acrylic urethane-based, epoxy-based, and silicone-based resins.

(Softening Material)

The base material of the transparent film according to the present invention may contain a material that further softens the polymer resin. As the softening material, a rubber elastic body, a brittleness improver, a plasticizer, a sliding ring polymer, and the like can be used. The softening material according to the present invention is a material that improves the number of times of folding endurance of the polymer resin such that the number of times of folding endurance satisfies Expression (1).

(Rubber Elastic Body)

According to the present invention, a rubber elastic body may be included in order to provide the flexibility to the transparent film. The rubber elastic body according to the present invention is a material that is included in the definition of rubber in JIS K6200 and that satisfies Expression (1) in a case of being mixed with a polymer resin. Since the rubber elastic body has flexibility singly, the rubber elastic body may be used as the base material singly without being mixed with the polymer resin according to the present invention.

Specific examples of the material of the rubber elastic body include styrene-butadiene rubber (SBR), butadiene rubber (BR), isoprene rubber (IR), isobutylene-isoprene rubber (IIR), chloroprene rubber (CR), ethylene-propylene rubber (EPM), ethylene-propylene-diene rubber (EPDM), acrylic rubber (ACM), urethane rubber (U), silicone rubber (Si, Q), fluoro rubber (FKM), nitrile rubber (NBR), synthetic natural rubber (IR), and natural rubber (NR) (abbreviated names by ASTM are provided in parentheses). Examples thereof include styrene-based, olefin-based, ester-based, urethane-based, and amide-based thermoplastic elastomers. According to the present invention, all of these can be desirably used singly or in a mixture with a polymer resin, as long as Expression (1) is satisfied.

As the material of the rubber elastic body and the physical properties thereof, those having a carbon-carbon double bond that does not constitute an aromatic ring, those having a core-shell particle form, and those crosslinked or polymerized which are defined as a rubbery polymer can also be preferably used.

[Rubber Elastic Body Having Carbon-Carbon Double Bond that does not Constitute Aromatic Ring]

A "carbon-carbon double bond that does not constitute an aromatic ring" refers to carbon-carbon double bonds among carbon-carbon double bonds that are included in aromatic rings. The rubber elastic body is preferably a polymer, more preferably has a carbon-carbon double bond that does not constitute an aromatic ring in a main chain, and even more preferably contains a repeating unit represented by Formula (B).

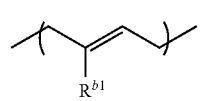

Formula (B)

In Formula (B), $R^{b1}$ represents a hydrogen atom or a methyl group.

$R^{b1}$ is preferably a hydrogen atom.

According to the present invention, the rubber elastic body preferably has a carbon-carbon double bond that does not constitute an aromatic ring, and core-shell particles or rubbery polymers can be used.

According to the present invention, the base material is preferably manufactured by using a solution film forming method. However, the rubber elastic body that is contained in a composition for forming a base material has a carbon-carbon double bond that does not constitute an aromatic ring, solubility and dispersibility to a solution become excellent, haze of the obtained film (particularly inside haze of film) can be decreased.

<Core-Shell Particles>

As the rubber elastic body, particles (core-shell particles) having a core-shell structure can be used. The core-shell particles have alternating layers of two kinds (core and one shell) or three or more kinds (core and two or more shells) of various polymers. Respective layers in the core-shell particles are preferably constituted from polymers having different glass transition temperatures (Tg).

A polymer having a low glass transition temperature is called a rubber phase that becomes a core, a polymer having a high glass transition temperature is called a hard phase that becomes a shell.

The core-shell particles can be manufactured, for example, by emulsion polymerization. Chemical crosslinking may be performed in a case of manufacturing one or more kinds of layers such that shapes and sizes of the core-shell particles do not change in blending.

Since a particle diameter does not change in the manufacturing of the film by using crosslinking-type core-shell particles, a particle diameter of the core-shell particles existing in the base material are easily controlled.

(Rubber Phase)

A base material uncrosslinked that can be used in the crosslinked rubber phase is a polymer of which a glass transition temperature is preferably less than 0° C., more preferably less than −20° C., and particularly preferably less than −40° C.

The glass transition temperatures of the rubber phases cannot be respectively measured but can be determined by manufacturing and isolating an emulsion polymer of the corresponding monomer composition and measuring the glass transition temperature. Another method of measuring the glass transition temperature of the rubber phase is to measure dynamic mechanical properties of a new polymer blend and dynamic mechanical properties of a matrix polymer singly. The maximum value of mechanical loss factor curves can be considered as a scale of the glass transition temperature.

The rubber phase existing in the core-shell particles suitable for the purpose of the present invention is 10 to 90, preferably 20 to 70, and particularly preferably 30 to 60 volume % based on the total volume of the particles.

The hard phase existing in the core-shell particles suitable for the purpose of the present invention is 90 to 10, preferably 80 to 30, and particularly preferably 70 to 40 volume % based on the total volume of the particle.

The manufacturing of the core-shell particles is well-known, and details thereof are disclosed in U.S. Pat. Nos. 3,833,682A, 3,787,522A, DE2116653A, DE2253689A, DE4132497A, DE4131738A, DE4040986A, US31251904A, and DE3300526A.

The polymer that is used as the rubber phase of the core-shell particles may be a homopolymer of copolymers constituted from two or more kinds of monomers.

The homopolymers or the copolymers used as the rubber phase can be derived from the following monomers:

conjugated diene monomers (for example, butadiene, isoprene, and chloroprene), monoethylenically unsaturated monomers, for example, alkyl and aryl acrylates (here, an alkyl group may be linear, cyclic, or branched, and an aryl group may have a substituent), alkyl and aryl methacrylates (here, an alkyl group may be linear, cyclic, or branched, and an aryl group may have a substituent), substituted alkyl and aryl methacrylates and acrylates (here, the substituent may be a linear, cyclic, or substituted alkyl group or a substituted aryl group), acrylonitrile and substituted acrylonitriles (for example, methacrylonitrile, α-methylene glutaronitrile, α-ethylacrylonitrile, and α-phenylacrylonitrile), alkyl- and arylacrylamides and substituted alkyl- and arylacrylamides, vinyl esters and substituted vinyl esters, vinyl ethers and substituted vinyl ethers, vinyl amides and substituted vinyl amides, vinyl ketones and substituted vinyl ketones, halogenated vinyls and substituted halogenated vinyls, for example, olefins having one or more double bonds to be used for manufacturing olefinic rubber, particularly, ethylene, propylene, butylene, 1,4-hexadiene, and vinyl aromatic compounds (for example, styrene, α-methylstyrene, vinyl toluene, alostyrenes, and tert-butylstyrenes).

The rubber phase based on organopolysiloxanes represented by Formula (II) also can be used in the production of the core-shell particles.

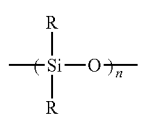

Formula (II)

In Formula (II), R is the same or different alkyl or alkenyl group having 1 to 10 carbon atoms, an aryl group, or a substituted hydrocarbon group. The alkyl and alkenyl groups may be linear, branched or cyclic. n represents a natural number of 2 or greater.

A rubber phase based on a fluorinated monoethylenically unsaturated compound, for example, tetrafluoroethylene, vinylidene fluoride, hexafluoropropene, chlorotrifluoroethylene, and perfluoro (alkyl vinyl) ethers can be used.

The rubber phase may be crosslinked, and may be manufactured from the polyfunctional unsaturated compound disclosed in DE1116653A, U.S. Pat. No. 3,787,522A, and EP0436080A, for this use. In these documents, the use of a grafting-on monomer is also disclosed. These compounds can be used for further chemically crosslinking shells with respect to a phase immediately below, if desired.

According to the present invention, in a case where core-shell particles are used as the rubber elastic body, the rubber phase that constitutes the core preferably consists of a compound having a carbon-carbon double bond that does not constitute an aromatic ring. However, particularly, the rubber phase of the rubber elastic body is preferably core-shell particles having a repeating unit derived from butadiene.

(Hard Phase)

The polymer that can be used in the hard phase of the core-shell particles is a homopolymer or a copolymer. The copolymers in the present specification may be constituted from two or more kinds of monomers. The characteristics common to the appropriate homopolymer and the appropriate copolymer are the glass transition temperature of 50° C. or higher.

The homopolymers or copolymers that can be used as the hard phase may be derived from the following monomers:

monoethylenically unsaturated compounds, for example, alkyl and aryl acrylates (here, an alkyl group may be linear, cyclic, or branched, and an aryl group may have a substituent), alkyl and aryl methacrylates (here, an alkyl group may be linear, cyclic, or branched, and an aryl group may have a substituent), substituted alkyl and aryl methacrylates and acrylates (here, the substituent may be a linear, cyclic, or substituted alkyl group or a substituted aryl group), acrylonitrile and substituted acrylonitriles (for example, methacrylonitrile, α-methylene glutaronitrile, α-ethylacrylonitrile, and α-phenylacrylonitrile), alkyl- and arylacrylamides, vinyl ester and substituted vinyl esters, vinyl ethers and substituted vinyl ethers, vinyl amides and substituted vinyl amides, vinyl ketones and substituted vinyl ketones, halogenated vinyls and substituted halogenated vinyls, olefins (for example, ethylene, propylene, and butylene), cyclic olefins (for example, norbornene, tetracyclododecene, 2-vinyl norbornene), fluorinated monoethylenically unsaturated compounds, for example, tetrafluoroethylene, vinylidene fluoride, hexafluoropropene, chlorotrifluoroethylene, and perfluoro (alkyl vinyl) ethers, and vinyl aromatic compounds represented by Formula

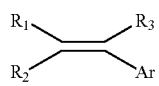

Formula (III)

In Formula (III), $R_1$, $R_2$, and $R_3$ may be identical to or different from each other and each represent hydrogen, a linear, branched, or cyclic alkyl group, and a substituted or unsubstituted aryl group. Ar represents an aromatic C6 to C18 group that may have an additional substituent, for example, an alkyl or a halogen group.

The hard phase may be crosslinked and may be manufactured from polyfunctional unsaturated compounds as disclosed in DE2116653A, U.S. Pat. No. 3,787,522A, and EP0436080A. In these documents, the use of a grafting-on monomer is disclosed. These compounds can be used for further chemically crosslinking shells with respect to a phase immediately below, if desired.

The polymer that is an uncrosslinked base material for a hard phase has a glass transition temperature of 50° C. or higher, preferably 80° C. or higher, and particularly preferably 100° C. or higher.

As the rubber elastic body, commercially available core-shell particles, for example, as disclosed in JP17514B or JP129266B, for example, Staphyloid GRADE of TAKEDA Chem. Industries., Kane-Ace GRADE of KANEKA disclosed in Knae ACE-B product catalog, Metablen C, Metablen W, and Metablen E GRADES of METABLEN Company BV disclosed in Metablen product catalog, for example, Gachter/Muller Kunststoff-Additive [Plastics Additives], Carl Hanser, Munich (1983), page XXIX below, PARALOID BTA733 catalog, Impact Modifiers for Clear Packaging (1987) of Rohm and Haas, Blendex GRADE manufactured by GE PLASTICS or Paraloid GRADE manufactured by ROHM and HAAS disclosed in PARALOID BTA-III N2 BTA-702 BTA 715 catalog (1989) of Rohm and Haas can be used.

As the form of the core-shell particles, it is preferable to use core-shell particles (MBS) having butadiene as a core and at least one (more preferably a styrene ratio is 10 mol % or greater and even more preferably 30 mol % or greater) of styrene and methyl methacrylate, as a shell.

In a case where the core-shell particles are used as the rubber elastic body, the content of the core-shell particles is preferably 2.5 to 50 mass %, more preferably 5 to 40 mass %, and even more preferably 10 to 25 mass % with respect to the total mass of the base material. In a case where the content of the core-shell particles is 2.5 mass % or greater, adhesiveness between the base material and the polarizer can be improved. In a case where the content thereof is 50 mass % or less, the haze (particularly inside haze of film) of the base material is small and preferable.

<Rubbery Polymer>

According to the present invention, a rubbery polymer can be used as the rubber elastic body. The rubbery polymer is a polymer having a glass transition temperature of 40° C. or lower. The rubbery polymer includes rubber and a thermoplastic elastomer. In a case where there are two or more glass transition temperatures as in a block copolymer, the rubbery polymer can be used as the rubbery polymer as long as the lowest glass transition temperature is 40° C. or lower. Mooney viscosity (ML1+4, 100° C.) of the rubbery polymer can be appropriately selected according to the purpose of the use, but is generally 5 to 300.

Examples of the rubbery polymer include a diene rubbers such as polybutadiene, polyisoprene, a random copolymer of styrene and butadiene or isoprene, acrylonitrile-butadiene copolymer, a butadiene-isoprene copolymer, a butadiene-(meth)acrylic acid alkyl ester copolymer, a butadiene-(meth) acrylic acid alkyl ester-acrylonitrile copolymer, a butadiene-(meth)acrylic acid alkyl ester-acrylonitrile-styrene copolymer; and a butylene-isoprene copolymer; an aromatic vinyl-conjugated diene-based block copolymer such as a styrene-butadiene block copolymer, a hydrogenated styrene-butadiene block copolymer, a hydrogenated styrene-butadiene random copolymer, a styrene-isoprene block copolymer, and a hydrogenated styrene-isoprene block copolymer, and a low crystalline polybutadiene resin.

As the rubbery polymer, a styrene-butadiene-styrene block copolymer (SBS) is preferably used.

The particle diameter of the rubber elastic body is preferably 10 nm to 500 nm, more preferably 50 nm to 300 nm, and even more preferably 50 nm to 100 nm.

In a case where the particle diameter of the rubber elastic body is 10 nm or greater, adhesiveness between the film and the polarizer is excellent. In a case where the particle diameter thereof is 500 nm or less, the haze of the film, particularly, the inside haze of the film is small.

The weight-average molecular weight of the rubber elastic body is preferably 50,000 to 200,000, more preferably 50,000 to 150,000, and even more preferably 50,000 to 100,000. In a case where the weight-average molecular weight of the rubber elastic body is 50,000 or greater, adhesiveness to the polarizer is excellent, and in a case where the weight-average molecular weight is 200,000 or less, the haze is small.

(Brittleness Improver)

According to the present invention, since the flexibility is provided to the transparent film, a brittleness improver may be included. Examples of the brittleness improver include the following compounds.

As the brittleness improver according to the present invention, the compound having a repeating unit is preferable. The compound having a repeating unit include a condensate or an adduct. Examples of the condensate preferably include a condensate of polyhydric alcohol and polybasic acid, a condensate of polyhydric ether alcohol and polybasic acid, and a condensate of a condensate of polyhydric alcohol and polybasic acid and an isocyanate compound. Examples of the adduct preferably include an adduct of acrylic acid ester and an adduct of methacrylic acid ester. A compound having at least one number-average molecular weight of 600 or greater selected from a polyether-based compound, a polyurethane-based compound, a polyether-based polyurethane compound, a polyamide-based compound, a polysulfone-based compound, a polysulfonamide-based compound, and other polymer-based compounds described below can be used.

Among these, at least one kind thereof is preferably a condensate of polyhydric alcohol and polybasic acid, a condensate of polyhydric ether alcohol and polybasic acid, an adduct of acrylic acid ester, and an adduct of methacrylic acid ester, more preferably a condensate of polyhydric alcohol and polybasic acid and an adduct of acrylic acid ester, and even more preferably a condensate of polyhydric alcohol and polybasic acid.

A condensate of polyhydric alcohol and polybasic acid and an adduct of acrylic acid ester which are a compound having a repeating unit preferably used in the present invention are described below per types.

(1) Condensate of Polyhydric Alcohol and Polybasic Acid

A condensate of polyhydric alcohol and polybasic acid is described. The preferably condensate of polyhydric alcohol and polybasic acid is not particularly limited but is preferably obtained by a reaction of dicarboxylic acid and glycol. Both terminals of the reaction product that can be obtained by the reaction of dicarboxylic acid and glycol may be the reaction product without change. However, in a case where the terminals are sealed by reacting monocarboxylic acid and monoalcohol, a change in retardation in a case of being preserved under a wet and hot environment can be suppressed and thus preferable. In such a condensate, the hydroxyl number at the terminal is decreased compared with that of the unsealed condensate, and the hydroxyl number is preferably 40 mgKOH/g or less, and more preferably 20 mgKOH/g or less, and even more preferably 10 mgKOH/g or less. The condensate between the polyhydric alcohol and the polybasic acid used in the present invention is preferably synthesized from glycol having 3 to 12 carbon atoms and dicarboxylic acid having 5 to 12 carbon atoms.

In the transparent film according to the present invention, the dicarboxylic acid used in the condensate of polyhydric alcohol and polybasic acid is preferably an aliphatic dicarboxylic acid residue having 5 to 12 carbon atoms or an alicyclic dicarboxylic acid residue or an aromatic dicarboxylic acid residue having 8 to 12 carbon atoms. The glycol is preferably an aliphatic or alicyclic glycol residue having 3 to 12 carbon atoms and an aromatic glycol residue having 6 to 12 carbon atoms. Hereinafter, dicarboxylic acid and glycol that can be preferably used in the synthesization of the condensate of polyhydric alcohol and polybasic acid are described.

As the dicarboxylic acid, both of aliphatic dicarboxylic acid and aromatic dicarboxylic acid can be used.

Examples of the aliphatic dicarboxylic acid include oxalic acid, malonic acid, succinic acid, maleic acid, fumaric acid, glutaric acid, adipic acid, suberic acid, azelaic acid, cyclohexane dicarboxylic acid, sebacic acid, and dodecane dicarboxylic acid. Among these, adipic acid, suberic acid, azelaic acid, and sebacic acid are preferably included in view of improvement of brittleness.

Examples of the aromatic dicarboxylic acid include phthalic acid, terephthalic acid, isophthalic acid, 1,5-naphthalenedicarboxylic acid, and 1,4-naphthalenedicarboxylic acid. Among these, phthalic acid and terephthalic acid are preferable, and terephthalic acid is particularly preferable.

The number of carbon atoms of the dicarboxylic acid used in the present invention is preferably 5 to 12, more preferably 6 to 10, and particularly preferably 6 to 8. According to the present invention, a mixture of two or more kinds of dicarboxylic acid may be used. In this case, the average number of carbon atoms of the two or more kinds of dicarboxylic acid is preferably in the above range.

It is preferable that aliphatic dicarboxylic acid and aromatic dicarboxylic acid are used in combination. Specifically, a combination of adipic acid and phthalic acid, a combination of adipic acid and terephthalic acid, a combination of succinic acid and phthalic acid, and a combination of succinic acid and terephthalic acid are preferable, a combination of succinic acid and phthalic acid and a combination of succinic acid and terephthalic acid are more preferable. In a case of a combination of aliphatic dicarboxylic acid and aromatic dicarboxylic acid, a ratio (molar ratio) of the both is not particularly limited, but is preferably 95:5 to 40:60 and more preferably 55:45 to 45:55.

Examples of the glycol (diol) used in the condensate of polyhydric alcohol and polybasic acid include aliphatic diol and aromatic diol, and aliphatic diol is preferable.

Examples of the aliphatic diol include alkyl diol or alicyclic diol, and examples thereof include ethylene glycol (ethanediol), 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 1,4-cyclohexanediol, 1,4-cyclohexanedimethanol, 2,2,4-trimethyl-1,3-pentanediol, 2-ethyl-1,3-hexanediol, 2-methyl-1,8-octanediol, 1,9-nonanediol, 1,10-decanediol, and diethylene glycol.

Aliphatic diol is preferably at least one of 1,4-butanediol, 1,5-pentanediol, and 1,6-hexanediol and particularly preferably at least one of 1,4-butanediol and 1,2-propanediol. In a case where two kinds thereof are used, ethylene glycol and 1,5-pentanediol are preferably used.

The number of carbon atoms of glycol is preferably 3 to 12, more preferably 4 to 10, and particularly preferably 4 to 8. In a case where two or more kinds of glycol are used, an average number of carbon atoms of the two or more kinds thereof are preferably in the above range.

The both terminals of the condensate of polyhydric alcohol and polybasic acid are preferably protected by a monoalcohol residue and a monocarboxylic acid residue.

In this case, the monoalcohol residue is preferably a substituted and unsubstituted monoalcohol residue having 1 to 30 carbon atoms, and examples thereof include aliphatic alcohol such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodeca octanol, allyl alcohol, and oleyl alcohol, and substituted alcohol such as benzyl alcohol and 3-phenylpropanol.

In a case of sealing with a monocarboxylic acid residue, monocarboxylic acid used as a monocarboxylic acid residue is preferably substituted and unsubstituted monocarboxylic acid having 1 to 30 carbon atoms. These may be aliphatic monocarboxylic acid or may be aromatic carboxylic acid. First, preferable aliphatic monocarboxylic acid is described, and examples thereof include acetic acid, propionic acid, butanoic acid, caprylic acid, caproic acid, decanoic acid, dodecanoic acid, stearic acid, and oleic acid. Examples of the aromatic monocarboxylic acid include benzoic acid, p-tert-butylbenzoic acid, ortho toluic acid, meta toluic acid, p-toluic acid, dimethyl benzoic acid, ethyl benzoic acid, normal propyl benzoic acid, aminobenzoic acid, and acetoxybenzoic acid. These may be used singly or in a mixture of two or more kinds thereof.

At this point, in a case where the number of carbon atoms of the monocarboxylic acid residues at the both terminals is 3 or less, the volatility decreases, and the reduction of the condensate of the polyhydric alcohol and the polybasic acid due to heating does not increase, and occurrence of process contamination and occurrence of planar failure can be reduced. In this point of view, aliphatic monocarboxylic acid is preferable as the monocarboxylic acids used in sealing. The monocarboxylic acid is more preferably aliphatic monocarboxylic acid having 2 to 22 carbon atoms, even more preferably aliphatic monocarboxylic acid having 2 to 3 carbon atoms, and particularly preferably an aliphatic monocarboxylic acid residue having 2 carbon atoms. For example, acetic acid, propionic acid, butanoic acid, benzoic acid, and derivatives thereof are preferable, acetic acid and propionic acid are more preferable, and most preferably acetic acid (terminals thereof becomes acetyl group). Two or more kinds of monocarboxylic acid used in sealing may be mixed.

In a case where the both terminals of the condensate of polyhydric alcohol and polybasic acid are not sealed, the condensate is preferably polyester polyol.

Above specific examples of the preferable condensate of polyhydric alcohol and polybasic acid include poly(ethylene glycol/adipic acid) ester, poly(propylene glycol/adipic acid) ester, poly(1,3-butanediol/adipic acid) ester, poly(propylene glycol/sebacic acid) ester, poly(1,3-butanediol/sebacic acid) ester, poly(1,6-hexanediol/adipic acid) ester, poly(propylene glycol/phthalic acid) ester, poly(1,3-butanediol/phthalic acid) ester, poly(propylene glycol/terephthalic acid) ester, poly(propylene glycol/1,5-naphthalene-dicarboxylic acid) ester, poly(propylene glycol/terephthalic acid) ester having 2-ethyl-hexyl alcohol ester at both terminals, poly(propylene glycol/adipic acid) ester having 2-ethyl-hexyl alcohol ester at both terminals, and acetylated poly(butanediol/adipic acid) ester.

The synthesization of the condensate of polyhydric alcohol and polybasic acid can be easily performed by a general method and by any one of a thermal melt condensation method by (poly)esterification reaction or transesterification reaction of the dicarboxylic acid or alkyl esters thereof and glycols and an interfacial condensation method between acid chlorides of these acids and glycols. Details description of these condensates of polyhydric alcohol and polybasic acid is disclosed in "Plasticizers, and Theory and Application Thereof" (Saiwai Shobo Co., Ltd., First edition published on Mar. 1, 1973) edited by Koichi Murai. Materials disclosed in JP1993-155809A (JP-H05-155809A), JP1993-155810A (JP-H05-155810A), JP1993-197073A (JP-H05-197073A), JP2006-259494A, JP1995-330670A (JP-H07-330670A), JP2006-342227A, and JP2007-003679A also can be used.

As a product, ADK CIZER (various types of ADK CIZER P series, ADK CIZER PN series, and the like are available) can be used as the condensate of polyhydric alcohol and polybasic acid from ADEKA Corporation disclosed in DIARY 2007, pages 55 to 27 can be used, and various products of POLYLITE disclosed in page 25 "Polymer related product list 2007 edition" of DIC Corporation and various products of POLYCIZER disclosed in pages 2 to 5 "DIC polymer modifier" of DIC Corporation (2004.4.1.000 VIII publication) can be used. The condensate of polyhydric alcohol and polybasic acid also can be obtained as Plasthall P series manufactured by The HallStar Company. Benzoyl functionalized polyethers are commercially available under the product name of BENZOFLEX from Velsicol Chemicals of Rosemont, Ill. (for example, BENZOFLEX 400, polypropylene glycol dibenzoate).

(2) Adduct of Acrylic Acid Ester

The composition of an adduct of acrylic acid ester preferably includes an aliphatic acrylic acid ester monomer, an acrylic acid ester monomer having an aromatic ring, or an acrylic acid ester monomer having a cyclohexyl group as a main component and more preferably includes an aliphatic acrylic acid ester monomer as a main component. The main component refers to a component of which a composition mass ratio is higher than those of other copolymerizable components in a (co)polymer.

The component mass ratio of these components is preferably 40 to 100 mass %, more preferably 60 to 100 mass %, and most preferably 70 to 100 mass %.

Examples of the aliphatic acrylic acid ester monomer include methyl acrylate, ethyl acrylate, propyl acrylate (i- and n-), butyl acrylate (n-, s-, and t-), pentyl acrylate (n-, i-, and s-), hexyl acrylate (n- and i-), heptyl acrylate (n- and i-), octyl acrylate (n- and i-), nonyl acrylate (n- and i-), myristyl acrylate (n- and i-), lauryl acrylate, (2-ethylhexyl) acrylate, (ε-caprolactone) acrylate, (2-hydroxyethyl) acrylate, (2-hydroxypropyl) acrylate, (3-hydroxypropyl) acrylate, (4-hydroxybutyl) acrylate, (2-hydroxybutyl) acrylate, (2-methoxyethyl) acrylate, (2-ethoxyethyl) acrylate, and (2-ethylhexyl) acrylate. Among these, butyl acrylate and (2-ethylhexyl) acrylate are preferable.

Examples of the acrylic acid ester monomer having an aromatic ring include phenyl acrylate, (2 or 4-chlorophenyl) acrylate, (2-, 3-, or 4-ethoxycarbonylphenyl) acrylate, (o-, m-, or p-tolyl) acrylate, benzyl acrylate, phenethyl acrylate, and (2-naphthyl) acrylate. Benzyl acrylate and phenethyl acrylate can be preferably used.

Examples of the acrylic acid ester monomer having a cyclohexyl group include cyclohexyl acrylate, (4-methylcyclohexyl) acrylate, and (4-ethylcyclohexyl) acrylate. Cyclohexyl acrylate can be preferably used.

In addition to the monomer, examples of a component that can be copolymerized include α, β-unsaturated acids such as acrylic acid and methacrylic acid, an unsaturated group-containing divalent carboxylic acid such as maleic acid, fumaric acid, and itaconic acid, aromatic vinyl compounds such as styrene and α-methylstyrene, α, β-unsaturated nitrile such as acrylonitrile and methacrylonitrile, maleic anhydride, maleimide, N-substituted maleimide, and glutaric anhydride. These may be used singly or in combination of two or more kinds of monomers, as copolymer components.

In order to perform synthesize a copolymer component having a weight-average molecular weight of 10,000 or less with an acrylic acid ester adduct, it is difficult to control the molecular weight in a general synthesization. Examples of a method of synthesizing a low molecular weight polymer include a method of using a peroxide polymerization initiator such as cumene hydroperoxide and t-butyl hydroperoxide, a method of using a polymerization initiator in a large amount by general synthesization, a method of using a chain transfer agent such as a mercapto compound or carbon tetrachloride in addition to the polymerization initiator, a method using a polymerization terminator such as benzoquinone or dinitrobenzene in addition to the polymerization initiator, and a method of performing bulk polymerization by using a synthesization catalyst obtained by using a compound having one thiol group and a secondary hydroxyl group as disclosed in JP2000-128911A or JP2000-344823A or using the above compound and the organometallic compound in combination. Any one of these is preferably used in the present invention, and methods disclosed in the publications are particularly preferable.

These brittleness improvers such as a condensate of polyhydric alcohol and polybasic acid and an adduct of acrylic acid ester may be used singly or in a mixture of two or more kinds thereof.

The weight-average molecular weight (Mw) of the brittleness improver used in the present invention is preferably 500 to 5,000, more preferably in the range of 700 to 4,000, and even more preferably in the range of 800 to 3,000. In a case where the molecular weight is 500 or greater, volatility from a film during film formation or after film formation hardly becomes a problem. In a case where the molecular weight is 5,000 or less, the compatibility with the polymer resin used in the present invention becomes satisfactory, and transparency can be maintained.

(Plasticizer)

In order to provide flexibility to the transparent film according to the present invention, a plasticizer may be used.

Examples of the plasticizer to be preferably added include a low molecular oligomer compound having a molecular weight in the range of about 190 to 5,000 within the range of physical properties. Examples thereof include phosphate ester, carboxylate ester, and polyol ester.

Examples of phosphate esters include triphenyl phosphate (TPP), tricresyl phosphate, cresyl diphenyl phosphate, octyl diphenyl phosphate, biphenyl diphenyl phosphate, trioctyl phosphate, and tributyl phosphate. Triphenyl phosphate and biphenyl diphenyl phosphate are preferable.

Representative examples of carboxylic acid ester include phthalic acid ester and citric acid ester. Examples of the phthalic acid ester include dimethyl phthalate, diethyl phthalate, dibutyl phthalate, dioctyl phthalate, diphenyl phthalate, and diethylhexyl phthalate. Examples of citric acid ester include O-acetyl triethyl citrate, 0-acetyl tributyl citrate, acetyl triethyl citrate, and acetyl tributyl citrate.

These preferable plasticizers are liquid other than TPP (melting point: about 50° C.) at 25° C. and has a boiling point of 250° C. or higher.

Examples of the other carboxylic acid esters include butyl oleate, methyl acetyl ricinoleate, dibutyl sebacate, and various trimellitic acid ester. Examples of the glycolic acid ester include triacetin, tributyrin, butyl phthalyl butyl glycolate, ethyl phthalyl ethyl glycolate, methyl phthalyl ethyl glycolate, methyl phthalyl methyl glycolate, propyl phthalyl propyl glycolate, and octyl phthalyl octyl glycolate.

Plasticizers disclosed in JP1993-194788A (JP-H5-194788A), JP1985-250053A (JP-S60-250053A), JP1992-227941A (JP-H04-227941A), JP1994-16869A (JP-H06-16869A), JP1993-271471A (JP-H05-271471A), JP1995-286068A (JP-H07-286068A), JP1993-5047A (JP-H05-5047A), JP1999-80381A (JP-H11-80381A), JP1995-20317A (JP-H07-20317A), JP1996-57879A (JP-H08-57879A), JP1998-152568A (JP-H10-152568A), and JP1998-120824A (JP-H10-120824A) are preferably used. According to these publications, in addition to examples of the plasticizer, many preferable disclosures of the usage methods thereof or characteristics thereof are provided, and thus can be preferably used in the present invention.

As the other plasticizers, (di)pentaerythritol esters disclosed in JP1999-124445A (JP-H11-124445A), glycerol esters disclosed in JP1999-246704A (JP-H11-246704A), diglycerol esters JP2000-63560A, citric acid esters disclosed in JP1999-92574A (JP-H11-92574A), substituted phenyl phosphate esters disclosed in JP1999-90946A (JP-H11-90946A), and an ester compound containing an aromatic ring and a cyclohexane ring disclosed in JP2003-165868A are preferably used.

A high molecular plasticizer having a resin component having a molecular weight of 1,000 to 100,000 is also preferably used. Examples thereof include polyester and/or polyether disclosed in JP2002-22956A, polyester ether, polyester urethane, or polyester disclosed in JP1993-197073A (JP-H05-197073A), copolyester ether disclosed in JP1990-292342A (JP-H02-292342A), and an epoxy resin or a novolac resin disclosed in JP2002-146044A.

As the plasticizer excellent in volatile resistance, bleed out, and low haze, polyester diol having a hydroxyl group is used at both ends disclosed in JP2009-98674A is preferable. As the plasticizer excellent in leveling and low haze of the transparent film according to the present invention, sugar ester derivatives disclosed in WO2009/031464A are preferable.

These plasticizers are may be used singly or in a mixture of two or more kinds thereof.

According to the present invention, a slide ring polymer can be preferably used in order to provide flexibility to the transparent film.

The above softening material may be singly mixed with the polymer resin, a plurality of softening materials may be appropriately mixed. Otherwise, without being mixed with a resin, only the softening material may be used singly or a plurality thereof are used in combination, as the transparent base material.

An amount of mixing these softening materials is not limited, as long as Expression (1) in a case where 10 parts by mass of the softening material is mixed with respect to 100 parts by mass of the polymer resin. That is, a polymer resin singly having a sufficient number of times of folding endurance may be singly used as a base material of the transparent film, the softening material may be mixed in a range in which Expression (1) is satisfied, and all may be the softening material (100%) so as to have a sufficient number of times of folding endurance.

(Other Additives)

In the base material, various additives (for example, ultraviolet absorbing agent, matte agent, antioxidant, peeling accelerator, and retardation (optical anisotropy) regulator) can be added according to the usage can be added in each of the preparation steps. These may be solid or may be an oil product. That is, a melting point or a boiling point thereof is not particularly limited. With respect to timing of adding the additive, adding may be performed at any timing in a step of producing a base material, and a step of adding the additive and performing preparation may be further performed in the material preparation step. Addition amounts of the respective materials are not particularly limited as long as the function is exhibited.

Respective additives are described below.

(Ultraviolet Absorbing Agent)

Examples of the ultraviolet absorbing agent include benzotriazole-based, 2-hydroxybenzophenone-based, and salicylic acid phenyl ester-based ultraviolet absorbing agents. Examples thereof include triazoles such as 2-(5-methyl-2-hydroxyphenyl) benzotriazole, 2-[2-hydroxy-3,5-bis($\alpha,\alpha$-dimethylbenzyl) phenyl]-2H-benzotriazole, and 2-(3,5-di-t-butyl-2-hydroxyphenyl)benzotriazole, and benzophenones such as 2-hydroxy-4-methoxybenzophenone, 2-hydroxy-4-octoxybenzophenone, and 2,2'-dihydroxy-4-methoxybenzophenone.

(Matte Agent)

The base material preferably contains a matte agent, in view of film slipperiness and manufacturing stability. The matte agent may be a matte agent of an inorganic compound and a matte agent of an organic compound.

As the preferable specific examples of the matte agent of the inorganic compound, an inorganic compound including silicon (for example, silicon dioxide, calcined calcium silicate, hydrated calcium silicate, aluminum silicate, and magnesium silicate), titanium oxide, zinc oxide, aluminum oxide, barium oxide, zirconium oxide, strontium oxide, antimony oxide, tin oxide, tin oxide-antimony, calcium carbonate, talc, clay, calcined kaolin, and calcium phosphate are preferable, an inorganic compound including silicon and zirconium oxide are more preferable. However, since the turbidity of the cellulose acylate film can be decreased, silicon dioxide is particularly preferably used. As the silicon dioxide fine particles, commercially available products having product names of AEROSIL R972, R974, R812, 200, 300, R202, OX50, and TT600 (above manufactured by Evonik Industries AG) can be used. As the zirconium oxide fine particles, commercially available silicon dioxide fine particles in the product names of AEROSIL R976 and R811 (above manufactured by Evonik Industries AG) can be used.

As the preferable specific examples of the matte agent of the organic compound, for example, include a silicone resin and an acrylic resin are preferable. Among the silicone resins, a silicone resin having a three-dimensional mesh structure is particularly preferable. For example, the commercially available products in the product names of TOSPEARL 103, TOSPEARL 105, TOSPEARL 108, TOSPEARL 120, TOSPEARL 145, TOSPEARL 3120, and TOSPEARL 240 (above manufactured by Momentive Performance Materials Inc.) can be used.

In a case where these matte agents are added to the polymer resin solution, the method thereof is not particularly limited. Any kinds of methods are possible as long as a desired polymer resin solution can be obtained. For example, an additive may be caused to be contained in the stage of mixing the polymer resin and the solvent, and the additive may be added after a mixed solution is produced with a polymer resin and a solvent. The additive may be added immediately before casting dope, this is a so-called immediate addition method, and in the mixture, screw type kneading is installed on-line to be used. Specifically, a static mixer such as an in-line mixer is preferable. As the in-line mixer, for example, a static mixer SWJ (Toray static in-tube mixer Hi-Mixer) (manufactured by Toray Engineering Co., Ltd.) is preferable. With respect to the in-line addition, in order to remove concentration unevenness, particle agglomeration, and the like, JP2003-053752A discloses an invention, for example, in which concentration unevenness and agglomeration of matte particles and the like are removed by, in a method for manufacturing a cyclic olefin-based resin film, causing a distance L between a tip of an adding nozzle for mixing the additive solution with a different composition to a main raw material dope and a starting end of an in-line mixer to be 5 times or less of the main raw material pipe inner diameter d. As a more preferable form, it is disclosed that, a distance (L) between a tip opening of an adding nozzle for adding the additive solution with a different composition to a main raw material dope and a starting end of an in-line mixer is caused to be 10 times or less of an inner diameter d of the supply nozzle tip opening, and the in-line mixer is a static non-stirring-type in-tube mixer or a dynamic stirring in-tube mixer. As a more specific example, a flow ratio of cellulose acylate film main raw material dope/in-line added liquid is 10/1 to 500/1 and is preferably 50/1 to 200/1. Also in JP2003-014933A of the invention of which the purpose is to provide a retardation film in which having little additive bleed out, no interlayer peeling phenomenon, good slidability, and excellent transparency, it is disclosed that, as the method of adding an additive, an additive may be added to a dissolving tank, or an additive or a solution obtained by dissolving or dispersing an additive between a dissolving tank and a co-casting die may be added to a dope during liquid transfer, but, in the latter case, mixing means such as a static mixer is preferably provided in order to increase mixing properties.

(Antioxidant)

As the antioxidant, any compound capable of preventing oxidation, deterioration, thermal decomposition, or thermal coloration in a case where a polymer resin used for the base material is formed or used in a film can be suitably added can be suitably added. An effect can be expected by adding an antioxidant appropriate for each by an action mechanism for trapping or decomposing alkyl radical or peroxide radical generated by oxidation of resin. Examples thereof include IRGANOX-1010 and IRGANOX-1076 manufactured by BASF SE, SUMILIZER GM, SUMILIZER GS, and the like manufactured by Sumitomo Chemical Company, Limited.

(Retardation Adjusting Agent)

A retardation adjusting agent may be added in the base material. As the retardation adjusting agent, any one of those that exhibit retardation (hereinafter, also referred to as a retardation enhancer) and those which reduce retardation (hereinafter, also referred to as a retardation reducing agent) can be preferably used.

The above additives may be used singly or two or more kinds thereof may be used in combination.

In view of transparency, the base material preferably has small difference between refractive indexes of the polymer resin and the flexibility materials or various additives used in the base material.

(Film Formation Method)

The transparent film of the present invention includes a scratch resistant layer and a base material, each may be produced singly or the both may be simultaneously produced, and the production method is not limited. For example, a scratch resistant layer may be applied or laminated on a base material produced in advance so as to be sequentially produced, or a scratch resistant layer and a base material may be simultaneously formed by an extruder and the like.

(Method of Producing Base Material)

The base material used for the transparent film of the present invention may be formed by thermally melting a thermoplastic polymer resin or may be formed by solution casting (solvent casting method) from a solution obtained by uniformly dissolving the polymer. In the case of hot melt film formation, the above softening materials and various additives may be added in a case of hot melting. Meanwhile, in a case where the base material used for the transparent film of the present invention is prepared from a solution, the above softening material and various additives may be added to the polymer solution (hereinafter also referred to as dope) in each preparation step. The timing of the addition may be added in any step in the dope production step, but a step of adding additives may be added to a final preparation step of the dope preparation step.

(Thickness of Base Material)

The thickness of the base material used in the transparent film of the present invention is preferably 3,000 µm or less, more preferably 100 µm or less, even more preferably 60 µm or less, and most preferably 50 µm or less. In a case where the thickness of the base material becomes thin, the difference in curvature between a front surface and a back surface in a case of bending becomes small, cracks or the like are hardly generated, and the base material does not break even in a case where bending is performed a plurality of times.

(Surface Treatment)

The transparent film of the present invention can improve adhesiveness between the film and another layer (for example, a polarizer, an undercoat, and a back layer), and the other substrates. For example, a glow discharge treatment, an ultraviolet irradiation treatment, a corona treatment, a flame treatment, an acid or alkali treatment can be used. The glow discharge treatment referred to herein may be low temperature plasma generated under a low pressure gas of $10^{-3}$ to 20 Torr and more preferably a plasma treatment under atmospheric pressure. The plasma excitation gas refers to gas excited by plasma under the above conditions, and examples thereof include fluorocarbons such as argon, helium, neon, krypton, xenon, nitrogen, carbon dioxide, and tetrafluoromethane, and mixtures thereof. Details of these are disclosed in pages 30 to 32 of Jill Journal of Technical Disclosure Monthly (No. 2001-1745, published on Mar. 15, 2001, Japan Institute of Invention and Innovation), and can be preferably used in the present invention.

1 Torr is 133.322 Pa.

(Relaxation Layer)

The transparent film of Form A may have a relaxation layer. The relaxation layer is preferably provided between the base material and the scratch resistant layer.

The relaxation layer is the same as the following relaxation layer of Form C.

(The Other Functional Layer)

The transparent film of the present invention may have a functional layer other than the scratch resistant layer and the relaxation layer. For example, a form having an easy adhesive layer for improving the adhesiveness is provided between the base material and the scratch resistant layer or between the base material and the relaxation layer, a form having an antistatic layer for providing antistatic properties, and a form of having an antifouling layer for providing antifouling properties to the scratch resistant layer are preferable, and a plurality of these may be included. Even in a case of having these functional layers, resistance to repetitive bending is required, and thus it is preferable that the film thickness of the functional layer is caused to be sufficiently thin, or a binder resin which is excellent in elasticity such as a scratch resistant fine particle layer is used in the functional layer.

(Easy Adhesive Layer)

In order to provide adhesiveness between the scratch resistant layer and the base material of the present invention, it is preferable to have an easy adhesive layer adjacent to the base material. With respect to the specific examples and preferable examples thereof such as materials and manufacturing methods used in this easy adhesive layer, disclosure of an easy adhesive layer on a hard coat layer side on [0068] to [0107] of JP2014-209162A can be referred to.

<Form B>

Subsequently, the transparent film of Form B is described below.

The transparent film of Form B is a transparent film including fine particles having indentation hardness of 400 MPa or greater and having a polygonal surface, and a binder resin at one side or on the both sides of the base material, the particle size of the fine particles is 100 nm to 1,000 nm in a case where the particle size of the fine particles is converted into a diameter of a virtual circle having a smallest area among the virtual circles which pass through arbitrary two vertices of a projection portion obtained by projecting the polygonal surface of the fine particles in a direction in which a projection area becomes maximum and include the projection portion within the virtual circles, and the fine particles at least exist in an outermost surface area of the transparent film.

The transparent film of Form B has a scratch resistant layer including hard fine particles having indentation hardness of 400 MPa or greater and a polygonal surface and a binder resin, and the fine particles exist in the outermost surface area of the transparent film. In a case where the polygonal surfaces of the fine particles having polygonal surfaces exist on the surface of the transparent film, the hardness of the film is improved, and the scratches of the film can be suppressed. As the elongation percentage of the binder resin is higher (flexibility is higher), in a case where the film is bent such that the scratch resistant layer becomes inside and the scratch resistant layer becomes outside, portions other than the fine particles in the scratch resistant layer can significantly expand and contract, such that the scratch resistant layer does not break or is not peeled off from the base material. As a result, it is possible to obtain a film that is hard and bends (excellent in resistance to bending).

{Scratch Resistant Fine Particle Layer}

The scratch resistant layer (scratch resistant fine particle layer) of Form B is the same as the above scratch resistant fine particle layer of Form A except that the contained fine particles are the fine particles having polygonal surfaces.

The evaluations of the film thickness and the pencil hardness test of the scratch resistant fine particle layer of Form B is the same as the evaluations of the film thickness and the pencil hardness test of the above scratch resistant fine particle layer of Form A.

[Fine Particles Having Polygonal Surfaces]

The fine particles contained in the scratch resistant fine particle layer of Form B are fine particles having polygonal surfaces.

Figure 4:
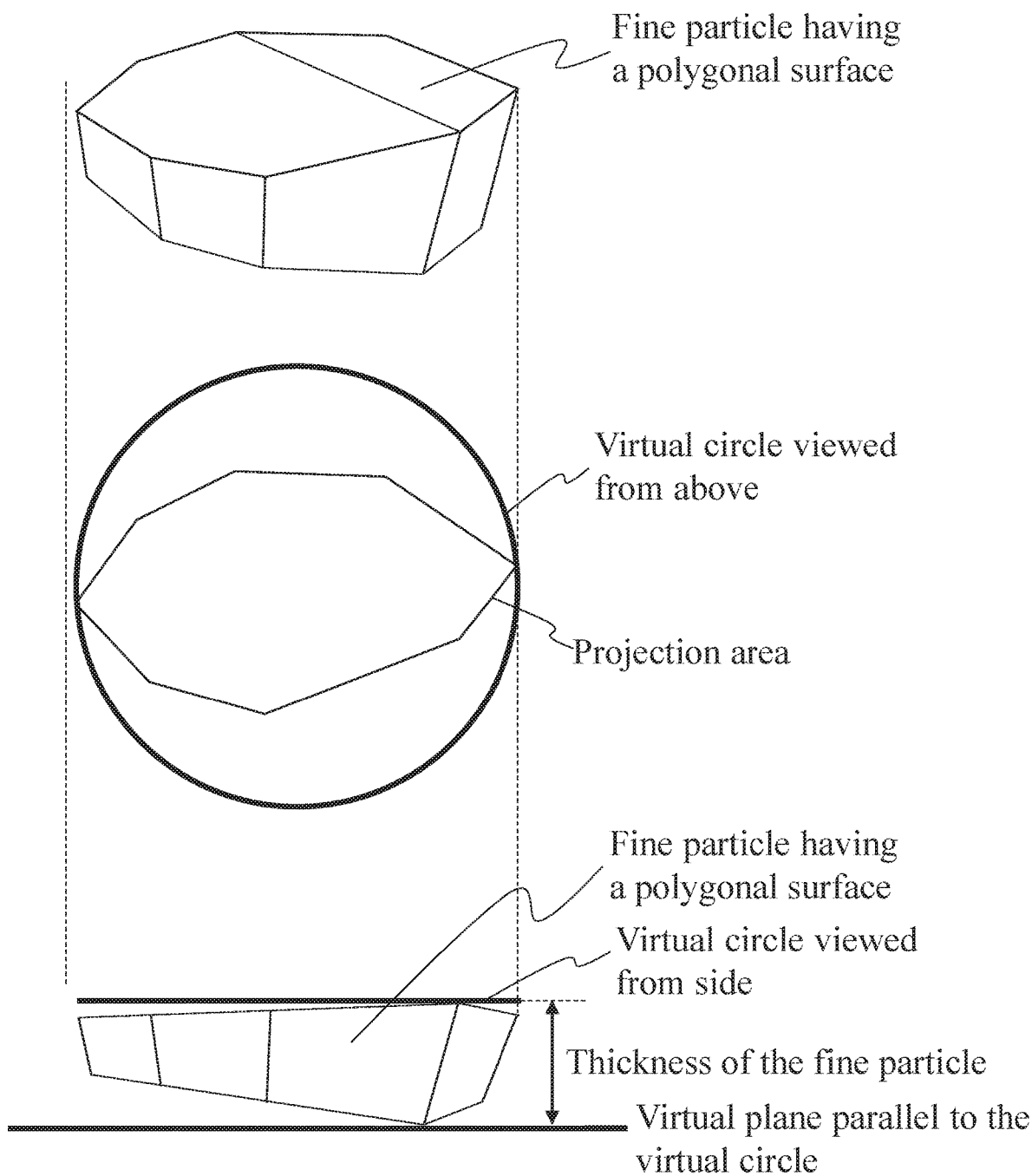
FIG. 4 is a diagram schematically illustrating how the diameter of a virtual circle expresses the size of the fine particle having the polygonal surface and also how the thickness of the fine particle is defined with respect to a virtual plane.

With reference to FIG. 4, the fine particles having the polygonal surface are fine particles of which a diameter of a virtual circle with a minimum area in which the virtual circle passes through arbitrary two vertices of the projection portion obtained by projecting the polygonal surface in a direction in which a projection area of the polygonal surface becomes maximum and includes the projection portion within the virtual circle is 100 nm to 1,000 nm.

The diameter of the virtual circle expresses the size of the fine particle having the polygonal surface, and a specific calculation method is described below.

First, the projection is performed in the direction in which the projection area of the fine particle becomes maximum, so as to obtain a projection portion. Subsequently, a circle that passes arbitrary two vertices of this projection portion (polygonal shape) and includes the projection portion within the circle is drawn. Subsequently, a diameter of this circle is obtained. In a case where a plurality of these circles can be drawn, a circle of which the area is the minimum is selected and the diameter of the circle is obtained.

Subsequently, in the present specification, a diameter (average value) of the virtual circle of the fine particles having polygonal surfaces is called an "average primary particle diameter".

In a case where the diameter of the virtual circle is 100 nm or greater, the diameter is preferable, since homogeneous dispersibility can be easily maintained in the scratch resistant fine particle layer, aggregate is hardly formed, and scattering hardly occurs. It is considered that the surface hardness and the expansion can be compatible, since hard portions (portions in which fine particles exist) in the scratch resistant fine particle layer and highly elastic portions (portion in which fine particles do not exist) independently function. In a case where the diameter of the virtual circle is 1,000 nm or less, light scattering hardly occurs by the fine particles, and the transparency of the film is improved. The fine particles fall off in a case where the film is bent, or breaks do not occur in the interface between the fine particles and the binder resin, and thus the diameter is preferable.

The polygonal shape is preferably a triangle to a dodecagon and more preferably a triangle to a hexagon.

In Form B, the fine particles at least exist on the outermost surface area of the transparent film. The outermost surface area of the transparent film of Form B and the indentation hardness of the fine particles are as described above in Form A.

According to the present invention, the area occupancy of the fine particles is defined by the following formula.

Area occupancy (%) of fine particles=100×area occupied by fine particles in surface of transparent film/area of surface of transparent film The area occupancy of the fine particles can be measured as an area occupancy of the fine particles positioned on the most surface side in a case of being observed from the surface by SEM and the like in a low acceleration voltage (3 kV and the like). The area occupancy is preferably 30% to 95%, more preferably 40% to 90%, and even more preferably 50% to 85%.

As the area occupancy of the fine particles is 30% or greater, the fine particles are rubbed in a case where rubbing is performed with steel wool which is the representative example in which the scratch resistance of the surface film is evaluated, and thus scratches are hardly generated in the surface film. In a case where the area occupancy is 95% or less, the binder resin expands and contracts in a case of being folded, and thus the resistance to bending can be sufficiently provided to the entire scratch resistant fine particle layer.

In the fine particles having the polygonal surface, a dispersion degree (Cv value) of the diameter of the virtual circle is preferably 10% or less, more preferably 8% or less, even more preferably 6% or less, and particularly preferably 4% or less.

The Cv value is a value (unit: %) obtained by calculation by Equation (2).

Cv value=([Standard deviation of diameter of virtual circle]/[average of diameter of virtual circle])× 100          (2)

As the value is smaller, the value means that sizes of the fine particles having polygonal surfaces are uniform. The diameter of the virtual circle is measured by using a scanning electron microscope (SEM). The average and the standard deviation of the diameter of the virtual circle are calculated based on measured values of the diameters of the virtual circles of 200 or more fine particles.

If the Cv value is 10% or less, in a case where the film thickness of the scratch resistant fine particle layer is close to or slightly thinner than the average primary particle diameter of the fine particles, the height of the fine particles protruding from the scratch resistant fine particle layer can be caused to be uniform, and the Cv value is particularly preferable since the scratch resistance can be caused to be satisfactory. Even in a case where the film thickness of the scratch resistant fine particle layer is thicker than the average primary particle diameter of the fine particles, if the Cv value is in this range, the frequency of the fine particles existing in the outermost surface area can be even on the entire film, and thus the Cv value is preferable.

If the fine particles having the polygonal surfaces are sandwiched between the virtual circle and the virtual plane parallel to the virtual circle (see FIG. 4), in a case where the distance between the virtual circle and the virtual plane is the thickness of the fine particles, the fine particles having the polygonal surface preferably has an irregular shape of which the ratio of the diameter and the thickness of the virtual circle (aspect ratio: diameter/thickness of virtual circle) is greater than 1.0, it is more preferable that the aspect ratio is 3.0 or greater, and it is even more preferable that a flat panel shape of which the aspect ratio is 5.0 or greater. In a case where the aspect ratio is greater than 1.0, the area of the polygonal surface of the fine particles occupying the outermost surface is greater than that in a case where spherical (aspect ratio=1.0) fine particles are used, and thus scratch resistance is improved.

The material of the fine particles having the polygonal surface of Form B is the same as the above fine particles of Form A.

As the fine particles having the polygonal surface, commercially available fine particles may be used. Specific examples include MD100 (average primary particle diameter of 100 nm, manufactured by Tomei Diamond Co., Ltd., scale diamond), MD150 (average primary particle diameter of 150 nm, manufactured by Tomei Diamond Co., Ltd., phosphorus piece diamond), MD200 (average primary particle diameter of 200 nm, manufactured by Tomei Diamond Co., Ltd., phosphorus piece diamond), MD300 (average primary particle diameter of 300 nm, manufactured by Tomei Diamond Co., Ltd., phosphorus piece diamond), MD1000 (average primary particle diameter of 1,000 nm, manufactured by Tomei Diamond Co., Ltd., phosphorus piece diamond), and HIT-60A (average primary particle diameter of 200 nm, manufactured by Sumitomo Chemical Co., Ltd., high purity alumina).

As the fine particles having the polygonal surface, commercially available particles may be calcined in the above conditions. Specific examples thereof include SUN-LOVELY (average primary particle diameter of 0.5 µm, aspect ratio 30, manufactured by AGC Si-Tech Co., Ltd., scale-like silica), SUNLOVELY C (average primary particle diameter of 0.5 µm, aspect ratio 30, manufactured by AGC Si-Tech Co., Ltd., scale-like silica).

[Scratch Resistant Fine Particle Layer Binder Resin]

The binder resin of the scratch resistant fine particle layer in Form B is the same as that of Form A.

In Form B, refractive indexes of the fine particles and the binder resin of the scratch resistant fine particle layer, components other than the scratch resistant fine particle layer, a method of forming the scratch resistant fine particle layer, a base material, an additive in the base material, a method of producing the base material, thickness of the base material, a surface treatment, a relaxation layer, and other functional layers are the same as those in Form A.

The thickness of the fine particles having the polygonal surfaces is preferably 50% or less of the thickness of the scratch resistant fine particle layer.

The transparent film of Form B is preferably a transparent film in which the thickness of the base material is 50 µm or less, the thickness of the fine particles having the polygonal surface is 50% or less of the thickness of the scratch resistant fine particle layer, and a ratio of the area occupied by the fine particles to the area of the outermost surface of the transparent film is 30% or greater.

It is preferable that the fine particles having the polygonal surface are unevenly distributed on the outermost surface area of the transparent film.

The fine particles having the polygonal surfaces exhibit hydrophobicity and thus unevenly distributed on the outermost surface area of the transparent film, in the course of producing the transparent film.

<Form C>

Subsequently, the transparent film of Form C is described below.

The transparent film of Form C is a transparent film having a scratch resistant layer at one side or on the both sides of the base material, in which the scratch resistant layer contains a cured product of the cross-linking compound in which the number of crosslinking groups in one molecule is 3 or more by 80 mass % or greater with respect to the total mass of the scratch resistant layer, and a relaxation layer is provided between the scratch resistant layer and the base material.

The transparent film of Form C has a scratch resistant layer containing the cured product of the cross-linking compound in which the number of crosslinking groups in one molecule is 3 or more by 80 mass % or greater with respect to the total mass of the scratch resistant layer, and thus hardness of the film is excellent, and scratches of the film can be suppressed. Since the relaxation layer is provided between the scratch resistant layer and the base material, in a case where the film is bent such that the scratch resistant layer becomes inside, or the scratch resistant layer becomes outside, the relaxation layer significantly expands and contracts, and thus the scratch resistant layer does not break or is not peeled off from the base material. As a result, it is possible to obtain a film that is hard and bends (excellent in resistance to bending).

{Cross-Linking Compound which Forms Scratch Resistant Layer and in which the Number of Crosslinking Groups in One Molecule is 3 or More}

The scratch resistant layer of Form C contains a cured product of the cross-linking compound in which the number of crosslinking groups in one molecule is 3 or more. The cross-linking compound in which the number of crosslinking groups in one molecule is 3 or greater may be a crosslinkable monomer, may be a crosslinkable oligomer, or may be a crosslinkable polymer. In a case where the number of crosslinking groups in one molecule of the cross-linking compound is 3 or more, dense three-dimensional crosslinking structure is easily formed, even in a case where a cross-linking compound is used having a small crosslinking group equivalent (generally called acryl equivalent in a case where a (meth)acryloyl group is provided as a crosslinking group), indentation hardness of the scratch resistant layer easily reaches 300 MPa.

The content of the cured product of the cross-linking compound in which the number of crosslinking groups in one molecule is 3 or more is preferably 80 mass % or greater, more preferably 85 mass % or greater, and even more preferably 90 mass % or greater with respect to the total mass of the scratch resistant layer.

The crosslinking group is preferably a (meth)acryloyl group, an epoxy group, or an oxetanyl group, more preferably a (meth)acryloyl group or an epoxy group, and most preferably a (meth)acryloyl group.

Examples of the crosslinkable monomer in which the number of crosslinking groups in one molecule is 3 or more include ester with polyhydric alcohol and (meth)acrylic acid. Specific examples thereof include pentaerythritol tri(meth)acrylate, pentaerythritol tetra(meth)acrylate, trimethylolpropane tri(meth)acrylate, trimethylol ethane tri(meth)acrylate, ditrimethylolpropane tetra(meth)acrylate, dipentaerythritol tetra(meth)acrylate, dipentaerythritol pentaacrylate, dipentaerythritol hexaacrylate, and pentaerythritol hexa(meth)acrylate. In view of high crosslinking properties, pentaerythritol triacrylate, pentaerythritol tetraacrylate, dipentaerythritol pentaacrylate, dipentaerythritol hexaacrylate, and a mixture of these are preferable.

In view of the resistance to bending of the transparent film, the film thickness of the scratch resistant layer of Form C is preferably 350 nm or less, more preferably 250 nm or less, and even more preferably 150 nm or less.

The scratch resistant layer of Form C may contain fine particles.

(Relaxation Layer)

The transparent film of Form C has a relaxation layer between the scratch resistant layer and the base material.

The relaxation layer is a layer for improving repetitive resistance to bending that the base material has.

The film thickness of the relaxation layer is preferably less than 10 μm, more preferably 1 to 9 μm, and even more preferably 2 to 7 μm.

The relaxation layer preferably includes a resin. Particularly, if a material that is more flexible and thinner than the base material is used, even in a case where a strong base material having hardness is used, resistance to bending can be caused to be satisfactory. The strength of the film is sometimes measured by pencil hardness, but an effect of recovering from scratches obtained by the pencil hardness test and removing the scratches can be obtained by providing a flexible relaxation layer, in some cases.

The indentation hardness of the relaxation layer is preferably smaller than the indentation hardness of the scratch resistant layer.

Examples of the resin used in the relaxation layer include those which are the same as the binder resin of the scratch resistant fine particle layer in Form A.

[Method of Forming Scratch Resistant Layer]

The scratch resistant layer is preferably formed by using a composition for forming a scratch resistant layer. Particularly, it is preferable that the scratch resistant layer is formed by coating the relaxation layer formed on the base material with the composition for forming a scratch resistant layer.

The composition for forming a scratch resistant layer can be prepared by dissolving or dispersing the respective components included in the scratch resistant layer in the solvent. It is preferable that the composition for forming a scratch resistant layer further contains the polymerization initiator.

Examples of the polymerization initiator include those which are the same as in Form A.

As the solvent, an organic solvent can be used, and solvents exemplified in Form A can be appropriately used.

In Form C, other components of the scratch resistant layer, additives in the base material, the method of producing the base material, the thickness of the base material, the surface treatment, and other functional layers are the same as those in Form A.

[Polarizing Plate]

The polarizing plate according to the present invention is a polarizing plate having a polarizer and at least one protective film that protects the polarizer, and at least one protective film is the transparent film of the present invention.

The polarizer (polarizing film) may be a so-called linear polarizer (linear polarizing layer) having a function of converting natural light to specific linear polarization. The polarizer is not particularly limited, but an absorption-type polarizer (absorption-type polarizing layer) can be used.

The types of the polarizer are not particularly limited, a polarizer that is generally used can be used, and for example, any one of an iodine-based polarizer, a dye-based polarizer using a dichroic dye (dichroic organic dye), and a polyene-based polarizer can be used. An iodine-based polarizer and a dye-based polarizer are generally produced by causing iodine or a dichroic dye to be adsorbed in polyvinyl alcohol and perform stretching.

The film thickness of the polarizer is not particularly limited. However, in view of thinning, the film thickness is preferably 50 μm or less, more preferably 30 μm or less, and even more preferably 20 μM or less. The film thickness of the polarizer is general 1 μm or greater and preferably 5 μm or greater.

In the present invention, the use of a coating-type polarizer produced by using a thermotropic liquid crystalline dichroic coloring agent as a polarizer and performing coating is a preferable form. That is, the polarizer is preferably a layer formed of a dichroic coloring agent composition including at least one thermotropic liquid crystalline dichroic coloring agent. Film thinning can be exhibited by using this polarizer, deterioration of the display performances of a display device can be further suppressed even under a wet heat environment. As the dichroic coloring agent for a coating-type polarizer used in the present invention, a coloring agent disclosed in JP2011-237513A can be appropriately used.

Examples of the thermotropic liquid crystalline dichroic coloring agent are provided below, but the invention is not limited to these compounds.

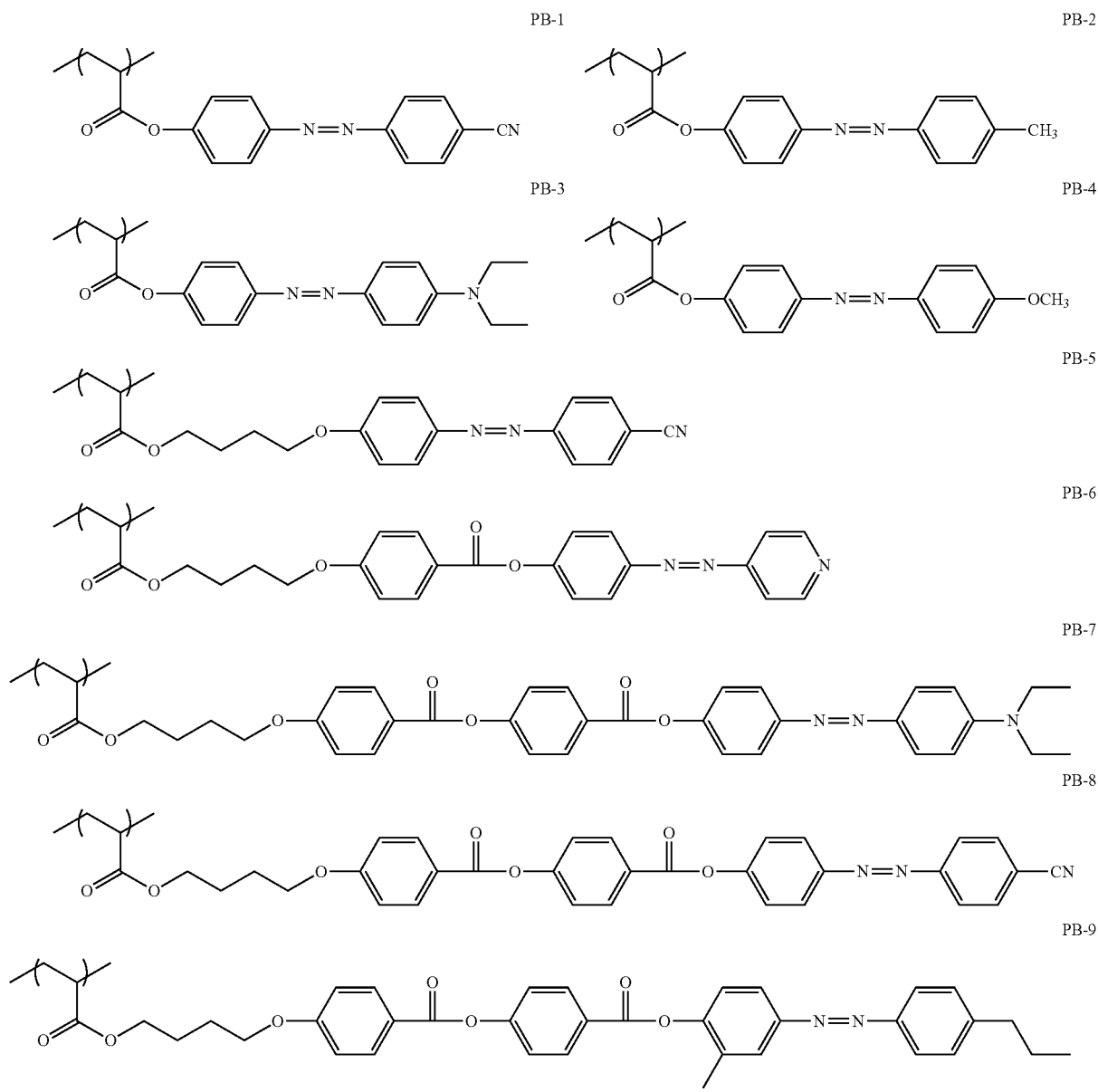

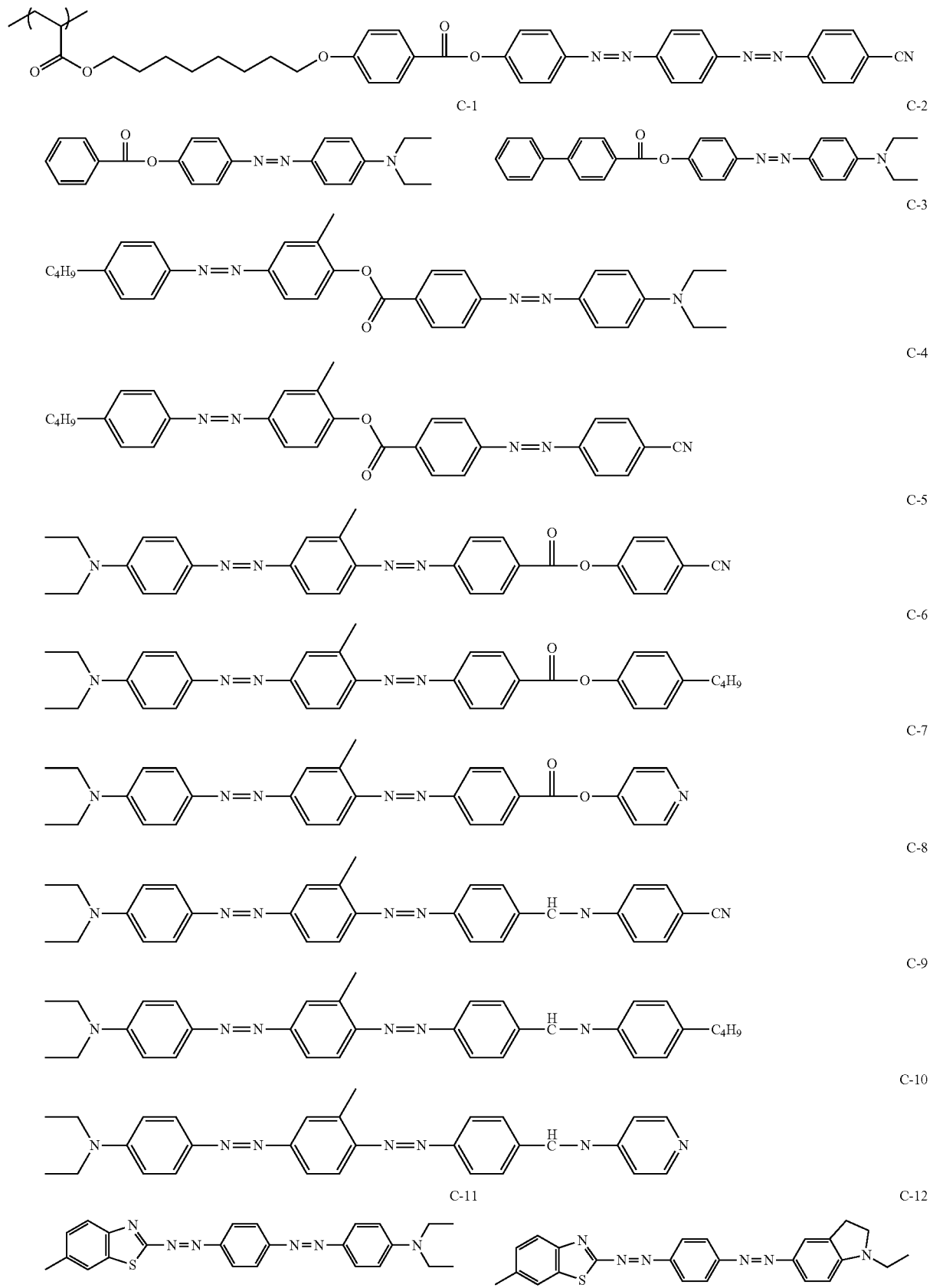

-continued

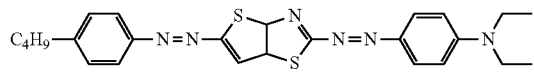
C-13

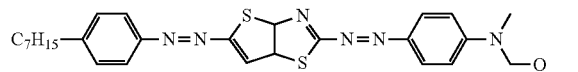
C-14

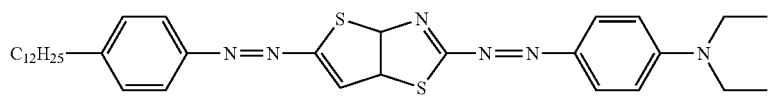
C-15

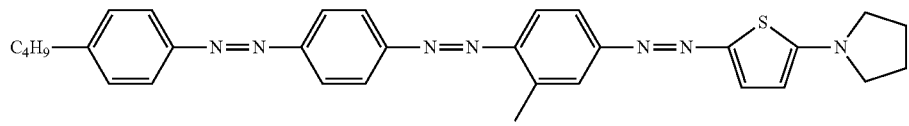
C-16

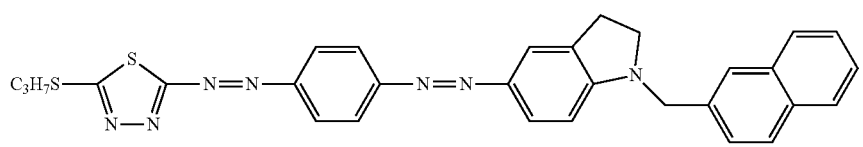
C-17

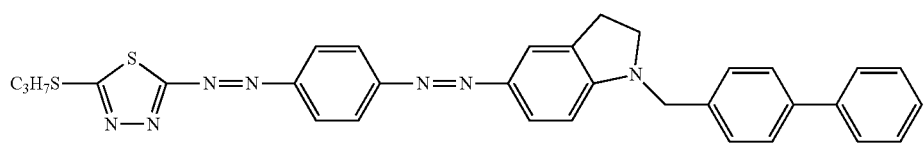
C-18

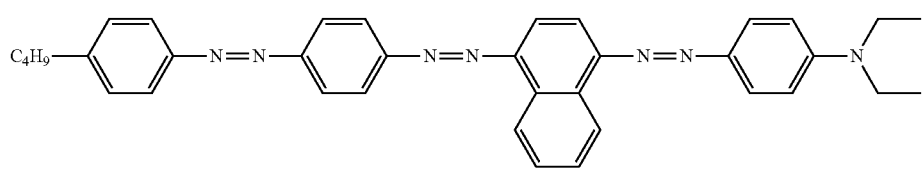
C-19

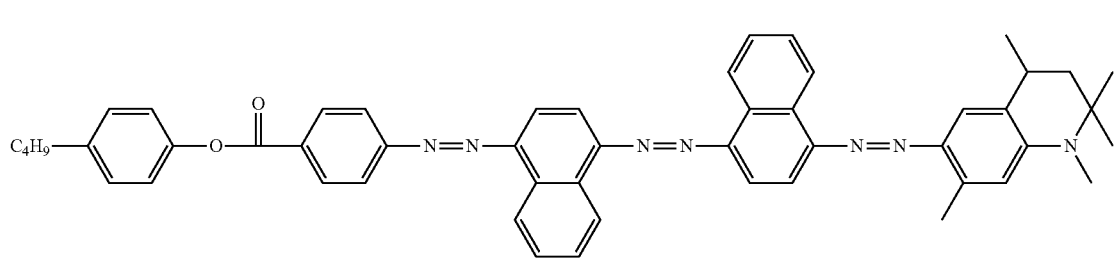
C-20

In the dichroic coloring agent composition, the proportion occupying a non-coloring liquid crystal compound is preferably 30 mass % or less, more preferably 20 mass % or less, even more preferably 10 mass % or less, and particularly preferably 5 mass % or less. Here, the non-coloring liquid crystal compound refers to a compound that does not exhibit absorption in the spectral region of visible light, that is, the spectral region of 400 to 700 nm and that exhibits a nematic liquid crystal phase or a smectic liquid crystal phase, and examples thereof include liquid crystal compounds disclosed in pages 154 to 192 and 715 to 722 of "Liquid Crystal Device Handbook" (edited by Japan Society for the Promotion of Science, No. 142 Committee, Nikkan Kogyo Shimbun, Ltd., 1989).

The thickness of the polarizer formed by using the dichroic coloring agent composition is not particularly limited, but is preferably 250 nm or greater, more preferably 350 nm or greater, and even more preferably 450 nm or greater. The upper limit thereof is not particularly limited. However, in view of thinning, the upper limit is preferably 2,000 nm or less.

[Image Displaying Device]

The image displaying device of the present invention has a transparent film or a polarizing plate of the present invention.

The transparent film and the polarizing plate of the present invention can be appropriately used in an image display device such as a liquid crystal display device (LCD), a plasma display panel (PDP), an electroluminescent display (ELD), and a display device using a cathode ray tube (CRT), and it is particularly preferable to be used in a liquid crystal display device or an electroluminescent display.

Generally, the liquid crystal display device has a liquid crystal cell and two polarizing plates disposed on both sides of the liquid crystal cell, and the liquid crystal cell carries and supports a liquid crystal between the two electrode substrates. One optically anisotropic layer may be disposed between a liquid crystal cell and one polarizing plate or two optically anisotropic layers may be disposed between the liquid crystal cell and the polarizing plates on the both sides. The liquid crystal cell is preferably in a Twisted Nematic (TN) mode, a vertically aligned (VA) mode, an optically compensatory bend (OCB) mode, an in-plane switching (IPS) mode, or an electrically controlled birefringence (ECB) mode.

It is preferable that the transparent film of the present invention is used in the outermost surface of the image displaying device. If it is considered that the image displaying device is carried by being rolled or folded in three folds in a case of not being viewed, it is extremely preferable that a scratch resistant layer having the same hardness is formed also on the surface opposite to the viewing side of the image displaying device of the present invention, in view of preventing scratches on both a viewing side surface and an opposite side surface. In a case where the opposite side surface is formed of a harder material, scratches on the viewing side surface may be generated due to vibration and the like during transportation. In a case where the opposite side surface is formed of a softer material, scratches on the opposite side surface may be generated.

EXAMPLES

Example 1

[Producing Base Material]
(Production of Base Material Film S-1)

A methacrylic resin having a weight-average molecular weight of 1,300,000 and a methyl methacrylate (MMA) ratio of 100% was synthesized by the following method. 300 g of ion exchanged water and 0.6 g of polyvinyl alcohol (degree of saponification: 80%, degree of polymerization 1,700) were added to a 1 L three-necked flask provided with a mechanical stirrer, a thermometer, and a cooling pipe and stirred to completely dissolve the polyvinyl alcohol, and 100 g of methyl methacrylate and 0.15 g of benzoyl peroxide were added and reacted at 85° C. for six hours. The obtained suspension was filtered through a nylon filter cloth, washed with water, and the filtrate was dried overnight at 50° C. to obtain the desired methacrylic resin in a bead shape (92.0 g).

100 parts by mass of the above methacrylic resin (polymethyl methacrylate (PMMA) having a molecular weight of 1,300,000), 50 parts by mass of rubber particles having a core-shell structure (KANE ACE M-210, manufactured by Kaneka Corporation), 0.1 parts by mass of SUMILIZER GS manufactured by Sumitomo Chemical Company, Limited, 383 parts by mass of dichloromethane as a solvent, and 57 parts by mass of methanol were put into a mixing tank and stirred under heating to dissolve each of the components for preparation.

The solution prepared as above was uniformly cast from a die onto a stainless steel endless band (casting substrate) to form a casting film. After the solvent contained in the casting film on the substrate was removed by drying, the casting film was peeled and transported as a self-supporting film from the casting substrate and was dried at 140° C. until the solvent was completely removed. Base Material Film S-1 having a thickness of 40 μm was produced in the above steps. The number of times of folding endurance measured by a method described below was 150,000 times.

(Production of Base Material Film S-3)

Rubber particles having a core-shell structure (KANE ACE M-210 manufactured by Kaneka Corporation) were heated and melted at 220° C. under a pressure of 30 MPa for 2 minutes by a heating press machine (manufactured by Toyo Seiki Seisaku-Sho, Ltd., MINI TEST PRESS), and the pressure was relieved and returned to normal temperature and normal pressure. Base Material Film S-3 having a thickness 40 μm was produced in the same manner as the producing of Base Material Film S-1 except for using rubber particles after a heat melting treatment.

The number of times of folding endurance measured by a method described below was 2,000,000 times.

(Production of Base Material Film S-4)
[Synthesization of Aromatic Polyamide]

674.7 kg of N-methyl-2-pyrrolidone, 10.6 g of anhydrous lithium bromide (manufactured by Sigma-Aldrich Japan K.K.), 33.3 g of 2,2'-ditrifluoromethyl-4,4'-diaminobiphenyl ("TFMB" manufactured by Toray Fine Chemicals Co., Ltd.) and 2.9 g of 4,4'-diaminodiphenylsulfone ("44 DDS" manufactured by Wakayama Seika Kogyo Co., Ltd.) were put into a polymerization tank provided with a stirrer and were cooled to 15° C. in a nitrogen atmosphere, and 18.5 g of terephthalic acid dichloride (manufactured by Tokyo Chemical Industry Co., Ltd.) and 6.4 g of 4,4'-biphenyl dicarbonyl chloride ("4 BPAC" manufactured by Toray Fine Chemical Co., Ltd.) were added in four portions under stirring over 300 minutes. After stirring for 60 minutes, hydrogen chloride generated in the reaction was neutralized with lithium carbonate so as to obtain a polymer solution.

A portion of the polymer solution obtained above was cast on an endless belt at 120° C. by using a T-die so that the final film thickness was 40 μm, was dried so that the polymer concentration became 40 mass %, and was peeled off from the endless belt. Subsequently, the film containing the solvent was stretched 1.1 times in a machine direction (MD) direction in the atmosphere at 40° C. and was washed with water at 50° C. so as to remove the solvent. The film was stretched 1.2 times in a transverse direction (TD) direction in a drying furnace at 340° C. to obtain Base Material Film S-4 consisting of aromatic polyamide and having a thickness of 40 μm. The number of times of folding endurance of Base Material Film S-4 was 10,000 times.

(Production of Base Material Film S-5)

Base Material Film S-5 was obtained in the same manner as the method of producing Base Material Film S-4 except for adjusting a discharging amount from the T die such that only the thickness became 60 μm. The number of times of folding endurance of Base Material Film S-5 obtained was 8,000 times.

(Production of Base Material Film PET40)

A polyethylene terephthalate base material (PET40) having a thickness of 40 μm was produced in the method disclosed in [0148] to [0160] of JP2014-209162A. The number of times of folding endurance of Base Material Film PET40 was 1,700,000 times.

[Producing Coating Liquid]
(Production of Calcined Scale Silica Particles R-1)

5 kg of commercially available scale silica particles (SUNLOVELY, manufactured by AGC Si-Tech Co., Ltd.) was put into a crucible, was calcined at 900° C. for one hour by using an electric furnace, was cooled, and was pulverized using a pulverizer, so as to obtain calcined scale silica particles before classification. Disintegration and classification were performed by using a jet pulverization classifier (IDS-2 type manufactured by Nippon Pneumatic Mfg. Co., Ltd.) so as to obtain Calcined Scale Silica Particles R-1. The average particle diameter of the obtained silica particles was 470 nm, and the dispersion degree (Cv value) of the particle diameter was 9.5%.

(Production of Calcined Scale Silica Particles R-2)

5 kg of commercially available scaly silica particles (SUNLOVELY, manufactured by AGC Si-Tech Co., Ltd.) was put into a crucible, was calcined at 1,050° C. for 2 hours by using an electric furnace, was cooled, and was pulverized by using a pulverizer, so as to obtain calcined scale silica particles before classification. Disintegration and classification were performed by using a jet pulverization classifier (IDS-2 type manufactured by Nippon Pneumatic Mfg. Co., Ltd.) so as to obtain Calcined Scale Silica Particles R-2. The average particle diameter of the obtained silica particles was 450 nm, and the dispersion degree (Cv value) of the particle diameter was 11.0%.

(Preparation of Scratch Resistant Fine Particle Layer Coating Liquid)

Each of the components was added to a mixing tank so as to have compositions as presented in Table 1, was stirred for 60 minutes, was dispersed by an ultrasonic disperser for 30 minutes, and was filtrated with a polypropylene filter having a pore diameter of 5 μm, so as to obtain a scratch resistant fine particle layer coating liquid. The urethane-based acrylate polymer in Table 1 is obtained by introducing a polymerizable group to SANRETAN TIM-2011A (manufactured by Sanyo Chemical Industries, Ltd.), and the photopolymerization initiator is IRGACURE 127.

In Table 1, numerical values of the respective components represent added amounts (parts by mass). The unit of the coating liquid concentration (solid content concentration) is "mass %". Solid contents represent components other than the solvent, and ethanol and methyl ethyl ketone (MEK) are solvents in Table 1. With respect to the fine particles, indentation hardness, an average primary particle diameter, and a dispersion degree Cv value of the average primary particle diameter are presented.

TABLE 1

| Name of fine particle layer coating composition | | | A-1 | A-2 | A-3 |
|---|---|---|---|---|---|
| Fine particle layer coating composition | Particle | Calcined Scale Silica Particles R-1 (Indentation hardness = 400 MPa, 470 nm, Cv value = 9.5%) | | | 63 |
| | | Calcined Scale Silica Particles R-2 (Indentation hardness = 600 MPa, 450 nm, Cv value = 11.0%) | 45 | 27 | |
| | Binder resin | Urethane-based acrylate polymer | 837 | 855 | 819 |
| | Others | Photopolymerization initiator | 18 | 18 | 18 |
| | | Ethanol | 540 | 540 | 540 |
| | | MEK | 60 | 60 | 60 |
| | | Solid content concentration | 60% | 60% | 60% |

(Preparation of Fine Particle Dispersion Liquids D1 to D10)

(Production of Dispersion Liquid D1)

200 parts by mass of ethanol and 50 parts by mass of Calcined Scale Silica Particles R-2 were charged into a mixing tank, were stirred for 10 minutes, and ultrasonically dispersed for 30 minutes while stirring was continued, to obtain Dispersion Liquid D1.

(Production of Dispersion Liquid D2)

200 parts by mass of ethanol, 50 parts by mass of HIT-60A (average primary particle diameter: 200 nm, indentation hardness: 2,950 MPa, manufactured by Sumitomo Chemical Company Limited), and 600 g of zirconia beads having a diameter of 0.5 mm (YTZ balls manufactured by Nikkato Corporation) were put into a 480 ml container and were dispersed at 50 Hz for 3 hours in a paint conditioner (Nishiyama Seisakusho Co., Ltd.). Thereafter, filtration was performed by using a tetoron mesh sheet T-No. 200T manufactured by atflon Co. Ltd., and 200 parts by mass of the liquid from which the zirconia beads were removed was put into a mixing tank and stirred for 10 minutes. Thereafter, ultrasonic dispersion was performed for 30 minutes while stirring was continued to obtain Dispersion Liquid D2.

(Production of Dispersion Liquid D3)

Dispersion Liquid D3 was obtained in the same manner as the production of Dispersion Liquid D2, except for using 49 parts by mass of HIT-60A (manufactured by Sumitomo Chemical Company Limited), and 1 parts by mass of 2,3-dihydroxynaphthalene (manufactured by Tokyo Chemical Industry Co., Ltd.) instead of 50 parts by mass of HIT-60A (manufactured by Sumitomo Chemical Company Limited) in the production of Dispersion Liquid D2.

(Production of Dispersion Liquid D4)

Dispersion Liquid D4 was obtained in the same manner as Dispersion Liquid D2, except for using cyclohexanone instead of ethanol in the production of Dispersion Liquid D2.

(Production of Dispersion Liquid D5)

Dispersion Liquid D5 was obtained in the same manner as Dispersion Liquid D2 except for using cyclohexanone instead of ethanol and using MD200 (average primary particle diameter: 200 nm, indentation hardness: 6,000 MPa, manufactured by Tomei Diamond Co., Ltd.) instead of HIT-60A in the production of Dispersion Liquid D2.

(Production of Dispersion Liquid D6)

Dispersion Liquid D6 was obtained in the same manner as Dispersion Liquid D2, except for using cyclohexanone instead of ethanol and using MD150 (average primary particle diameter: 150 nm, indentation hardness: 6,000 MPa, manufactured by Tomei Diamond Co., Ltd.) instead of HIT-60A, in the production of Dispersion Liquid D2.

(Production of Dispersion Liquid D7)

Dispersion Liquid D7 was obtained in the same manner as Dispersion Liquid D2 except for using cyclohexanone instead of ethanol and using MD300 (average primary particle diameter: 300 nm, indentation hardness: 6,000 MPa, manufactured by Tomei Diamond Co., Ltd.) instead of HIT-60A, in the production of Dispersion Liquid D2.

(Production of Dispersion Liquid D8)

Dispersion Liquid D8 was obtained in the same manner as Dispersion Liquid D2 except for using cyclohexanone instead of ethanol and using MD100 (average primary particle diameter: 100 nm, indentation hardness: 6,000 MPa, manufactured by Tomei Diamond Co., Ltd.) instead of HIT-60A, in the production of Dispersion Liquid D2.

(Production of Dispersion Liquid D9)

Dispersion Liquid D9 was obtained in the same manner as Dispersion Liquid D2 except for using cyclohexanone instead of ethanol and using MD1000 (average primary particle diameter: 1 μm, indentation hardness: 6,000 MPa, manufactured by Tomei Diamond Co., Ltd.) instead of HIT-60A, in the production of Dispersion Liquid D2.

(Production of Dispersion Liquid D10) 200 parts by mass of ethanol and 50 parts by mass of commercially available scale silica particles (SUNLOVELY, manufactured by AGC Si-Tech Co., Ltd.) were put into a mixing tank, were stirred for 10 minutes, and ultrasonically dispersed for 30 minutes while stirring was continued, so as to obtain Dispersion Liquid D10.

Each of the components was added to a mixing tank so as to have compositions as presented in Table 2, was stirred for 60 minutes, was dispersed by an ultrasonic disperser for 30 minutes, and was filtrated with a polypropylene filter having a pore diameter of 5 μm, so as to obtain Scratch resistant Fine Particle Layer Coating Liquids HC1 to HC15. The numerical values in Table 2 represent parts by mass.

TABLE 2

| | HC1 | HC2 | HC3 | HC4 | HC5 | HC6 | HC7 | HC8 | HC9 | HC10 | HC11 | HC12 | HC13 | HC14 | HC15 |
|---|---|---|---|---|---|---|---|---|---|---|---|---|---|---|---|
| DPHA | 28.9 | 28.9 | 28.9 | 28.9 | 21.7 | 7.2 | 7.2 | 28.9 | 28.9 | 28.9 | 28.9 | 28.9 | 28.9 | 31.1 | 24.6 |
| X-12-1048 | 19.3 | 19.3 | 19.3 | 19.3 | 14.5 | 4.8 | 4.8 | 19.3 | 19.3 | 19.3 | 19.3 | 19.3 | 19.3 | 19.3 | 19.3 |
| Methyl isobutyl ketone | — | — | — | 19.7 | 33.0 | 58.3 | 57.7 | 49.3 | 19.7 | 19.7 | 19.7 | 19.7 | — | 28.7 | — |
| Ethanol | 7.8 | 7.8 | 7.8 | — | — | — | — | — | — | — | — | — | 7.8 | — | — |
| Methyl ethyl ketone | 4.6 | 4.6 | 4.0 | — | — | — | — | — | — | — | — | — | 4.6 | — | — |
| Acetone | 7.8 | 7.8 | 7.8 | — | — | — | — | — | — | — | — | — | 7.8 | — | — |
| IRGACURE 127 | 2.0 | 2.0 | 2.0 | 2.0 | 1.5 | 0.5 | 0.5 | 2.0 | 2.0 | 2.0 | 2.0 | 2.0 | 2.0 | 2.0 | 2.0 |
| M1245 | 0.5 | 0.5 | 0.5 | 0.5 | 0.4 | 0.1 | 0.1 | 0.5 | 0.5 | 0.5 | 0.5 | 0.5 | 0.5 | 0.5 | 0.5 |
| Dispersion Liquid D1 | 29.0 | — | — | — | — | — | — | — | — | — | — | — | — | — | — |
| Dispersion Liquid D2 | — | 29.0 | — | — | — | — | — | — | — | — | — | — | — | — | — |
| Dispersion Liquid D3 | — | — | 29.6 | — | — | — | — | — | — | — | — | — | — | — | — |
| Dispersion Liquid D4 | — | — | — | 29.6 | — | — | 29.6 | — | — | — | — | — | — | 17.8 | 53.3 |
| Dispersion Liquid D5 | — | — | — | — | 29.0 | 29.0 | — | — | — | — | — | — | — | — | — |
| Dispersion Liquid D6 | — | — | — | — | — | — | — | — | 29.6 | — | — | — | — | — | — |
| Dispersion Liquid D7 | — | — | — | — | — | — | — | — | — | 29.6 | — | — | — | — | — |
| Dispersion Liquid D8 | — | — | — | — | — | — | — | — | — | — | 29.6 | — | — | — | — |
| Dispersion Liquid D9 | — | — | — | — | — | — | — | — | — | — | — | 29.6 | — | — | — |
| Dispersion Liquid D10 | — | — | — | — | — | — | — | — | — | — | — | — | 29.0 | — | — |

DPHA: KAYARAD DPHA manufactured by Nippon Kayaku Co., Ltd.

X-12-1048: manufactured by Shin-Etsu Chemical Co., Ltd.

IRGACURE 127: Photopolymerization initiator manufactured by BASF SE

M1245: Photoacid generator manufactured by Tokyo Chemical Industry Co., Ltd.

DPCA-20: KAYARAD DPCA-20 manufactured by Nippon Kayaku Co., Ltd.

Each of the components was added to a mixing tank so as to have compositions as presented in Table 3, was stirred for 60 minutes, was dispersed by an ultrasonic disperser for 30 minutes, and was filtrated with a polypropylene filter having a pore diameter of 5 μm, so as to obtain Scratch resistant Layer Coating Liquids HC16 to HC20. The numerical values in Table 3 represent parts by mass.

TABLE 3

| | HC16 | HC17 | HC18 | HC19 | HC20 |
|---|---|---|---|---|---|
| DPHA | 4.0 | 4.0 | 40.0 | — | — |
| DPCA-20 | — | — | — | 4.0 | 40.0 |
| Methyl ethyl ketone | 80.0 | 80.0 | 80.0 | 80.0 | 80.0 |
| Propylene glycol monomethyl ether acetate | 20.0 | 20.0 | 20.0 | 20.0 | 20.0 |
| IRGACURE 127 | 0.2 | 0.3 | 1.6 | 0.2 | 1.6 |
| X-22-164C | — | 0.5 | — | — | — |
| RS-90 | 0.5 | — | 2.0 | 0.5 | 2.0 |

X-22-164C: Silicone-based sliding agent manufactured by Shin-Etsu Chemical Co., Ltd.

RS-90: Perfluoro fluorine-based slipping agent manufactured by DIC Corporation (Preparation of Relaxation Layer Coating Liquid)

1152 parts by mass of a polymer obtained by introducing a polymerizable group to a urethane-based acrylate polymer SANRETAN TIM-2011A (manufactured by Sanyo Chemical Industries, Ltd.), 48 parts by mass of a photopolymerization initiator IRGACURE 127, and 3,104 parts by mass of methyl ethyl ketone (MEK) were put into a mixing tank and stirred for 60 minutes, and filtration was performed with a polypropylene filter having a pore size of 5 μm, so as to obtain Relaxation Layer Coating Liquid B-1.

In the same manner, 100 parts by mass of DPCA-20, 5 parts by mass of a photopolymerization initiator IRGACURE 127, and 100 parts by mass of toluene were put into a mixing tank, were stirred for 60 minutes, and were filtrated with a polypropylene filter having a pore size of 0.2 μm Relaxation Layer Coating Liquid B-2.

[Producing Transparent Films C-1, C-3 to C-5, and C-7 to C-8]

Fine Particle Layer Coating Liquid A-1 was applied to a base material film (PET40) by using a gravure coater, was dried at 60° C., and was cured by being irradiated with an air-cooled metal halide lamp to produce Transparent Film C-1. The film thickness of the scratch resistant fine particle layer was 0.8 μm.

As presented in Table 4, Transparent Films C-3 to C-5, and C-7 to C-8 were produced in the same method as Transparent Film C-1, except for adjusting film thicknesses by using base materials (PET40, S-1, or S-3) and Scratch resistant Fine Particle Layer Coating Liquids A-1 to A-3.

[Producing Transparent Films C-2 and C-6]

Relaxation Layer Coating Liquid B-1 was applied to a base material film (PET40) by using a gravure coater, was dried at 60° C., and was half-cured by being irradiated with an air-cooled metal halide lamp. Scratch resistant Fine Particle Layer Coating Liquid A-1 was applied thereto by using a gravure coater, was dried at 60° C., and was cured by being irradiated with an air-cooled metal halide lamp, so as to produce Transparent Film C-2. The film thickness of the relaxation layer was 5.0 and the film thickness of the scratch resistant fine particle layer was 0.8 μm.

Transparent Film C-6 was produced in the same method as Transparent Film C-2 except for using Base Material Film S-1 as the base material.

TABLE 4

| Name of specimen | | Example C-1 | Example C-2 | Reference Example C-3 | Example C-4 | Example C-5 | Example C-6 | Example C-7 | Comparative Example C-8 |
|---|---|---|---|---|---|---|---|---|---|
| Name of fine particle layer coating composition | | A-1 | A-1 | A-2 | A-1 | A-3 | A-1 | A-3 | — |
| Name of relaxation layer coating liquid | | — | B-1 | — | — | — | B-1 | — | — |
| Film evaluation | Base material | PET40 | PET40 | PET40 | S-1 | S-1 | S-1 | S-3 | S-1 |
| | Fine particle layer film thickness | 0.8 μm | 0.8 μm | 3.5 μm | 0.8 μm | 0.2 μm | 0.8 μm | 0.2 μm | 0 |
| | Fine particle layer indentation hardness [MPa] | 310 | 320 | 300 | 310 | 300 | 320 | 310 | 240 |
| | Fine particle layer area occupancy | 50% | 50% | 30% | 50% | 70% | 50% | 70% | — |

[Producing Transparent Films E-1 to E-21]

Transparent Films E-1 to E-21 were produced by combining base materials and scratch resistant fine particle layer coating liquids as presented in Table 5. The base materials were coated with scratch resistant fine particle layer coating liquids by 2.8 ml/m² by using a gravure coater. After drying was performed at 60° C., curing was performed by irradiation with an air-cooled metal halide lamp, so as to produce transparent films. The film thicknesses of the scratch resistant fine particle layers were as presented in Table 5. Base Material PET40 was coated with a scratch resistant fine particle layer coating liquid on the surface coated with Easy Adhesive Layer Coating Liquid H1 on a hard coat layer side disclosed in JP2014-209162A.

TABLE 5

| Name of specimen | Example E-1 | Example E-2 | Example E-3 | Example E-4 | Example E-5 | Example E-6 | Example E-7 | Example E-8 | Example E-9 | Comparative Example E-10 |
|---|---|---|---|---|---|---|---|---|---|---|
| Base material | PET40 | PET40 | PET40 | PET40 | PET40 | PET40 | S-4 | S-4 | S-4 | PET40 |
| Scratch resistant fine particle layer coating liquid | HC1 | HC2 | HC3 | HC4 | HC5 | HC6 | HC4 | HC7 | HC6 | HC8 |
| Scratch resistant fine particle layer film thickness | 0.8 μm | 0.8 μm | 0.8 μm | 0.8 μm | 0.8 μm | 0.2 μm | 0.8 μm | 0.2 μm | 0.2 μm | 0.8 μm |
| Fine particle layer indentation hardness [MPa] | 310 | 320 | 340 | 340 | 330 | 335 | 340 | 350 | 335 | 260 |
| Fine particle thickness/layer film thickness | 1.3% | 25% | 25% | 25% | 1.3% | 5.0% | 25% | 100% | 5.0% | — |

| Name of specimen | Comparative Example E-11 | Example E-12 | Example E-13 | Comparative Example E-14 | Comparative Example E-15 | Comparative Example E-16 | Example E-17 | Example E-18 | Example E-19 | Example E-20 | Example E-21 |
|---|---|---|---|---|---|---|---|---|---|---|---|
| Base material | S-4 | S-4 | S-4 | S-4 | S-4 | S-4 | S-5 | S-4 | S-4 | S-4 | S-4 |
| Scratch resistant fine particle layer coating liquid | HC8 | HC9 | HC10 | HC11 | HC12 | HC13 | HC4 | HC5 | HC4 | HC14 | HC15 |
| Scratch resistant fine particle layer film thickness | 0.8 μm | 0.8 μm | 0.8 μm | 0.8 μm | 0.8 μm | 0.8 μm | 0.8 μm | 0.05 μm | 1.0 μm | 0.8 μm | 0.8 μm |
| Fine particle layer indentation hardness [MPa] | 250 | 330 | 330 | 260 | 240 | 230 | 340 | 350 | 335 | 340 | 340 |

TABLE 5-continued

| | | | | | | | | | | |
|---|---|---|---|---|---|---|---|---|---|---|
| Fine particle thickness/layer film thickness | — | 1.3% | 1.3% | 1.3% | 1.3% | 1.3% | 25% | 50% | 20% | 25% | 25% |

[Producing Transparent Films F-1 to F-5]

Transparent Films F1 to F5 were produced by combining base materials, relaxation layers, and scratch resistant layer coating liquids presented in Table 6. The base materials were coated with Relaxation Layer Coating Liquid B-2 by using a gravure coater, were dried at 60° C., and were half-cured by irradiation with an air-cooled metal halide lamp. The Scratch resistant Layer Coating Liquid HC16 was applied thereto by using a gravure coater at 2.8 ml/m$^2$, was dried at 60° C., and was cured by irradiation with an air-cooled metal halide lamp, so as to produce transparent films. The film thicknesses of the scratch resistant layers are presented in Table 6.

TABLE 6

| Name of specimen | Example F-1 | Example F-2 | Comparative Example F-3 | Comparative Example F-4 | Comparative Example F-5 |
|---|---|---|---|---|---|
| Base material | S-4 | S-4 | S-4 | S-4 | S-4 |
| Relaxation layer | B-2 | B-2 | B-2 | B-2 | B-2 |
| Scratch resistant layer coating liquid | HC16 | HC17 | HC18 | HC19 | HC20 |
| Relaxation layer film thickness | 5 μm | 5 μm | 5 μm | 5 μm | 5 μm |
| Relaxation layer indentation hardness [MPa] | 240 | 240 | 240 | 240 | 240 |
| Scratch resistant layer film thickness | 0.07 μm | 0.35 μm | 1.1 μm | 0.07 μm | 1.1 μm |
| Scratch resistant layer indentation hardness [MPa] | 310 | 310 | 310 | 240 | 240 |

(Evaluation of Transparent Film)

(The Number of Times of Folding Endurance)

Measurement was performed under the condition of a load of 500 g in conformity with JIS P8115 (2001) by using a folding endurance testing machine (manufactured by Tester Sangyo Co., Ltd., MIT, BE-201 type, folding radius of 0.4 mm) and using a specimen film which was left for one hour or longer in a state of 25° C. and 65% RH and which has a width of 15 mm, a length of 80 mm, and a thickness of 40 μm, and evaluation was performed based on the number of times until the specimen film was broken. As the number of times of folding endurance is larger, the specimen film was strong against bending and was excellent in resistance to repetitive bending.

(Pencil Hardness Test)

The pencil hardness evaluation disclosed in JIS K 5600-5-4 (1999) was performed under the condition of a load of 500 g, and pencil marks were removed with an eraser. Each of the specimens was humidified at a temperature of 25° C. and a relative humidity of 60% for three hours, was subjected to hardness evaluation by using a pencil for test specified in JIS S 6006 (2007), was left under the circumstances of a temperature of 25° C. and a relative humidity of 60% for three hours, and was evaluated in the following standards.

A: Scratch marks were not observed after a 3H test.
B: Scratch marks were not observed after a 2H test.
C: Scratch marks were not observed after an H test.
D: Scratch marks were observed after an H test and made trouble.

(Pencil Hardness Test <Immediately Afterwards>)

The pencil hardness evaluation disclosed in JIS K 5600-5-4 (1999) was performed under the condition of a load of 500 g, and the pencil marks were removed with an eraser. Each of the specimens was humidified at a temperature of 25° C. and a relative humidity of 60% for three hours, was subjected to hardness evaluation by using a pencil for test specified in ES S 6006 (2007), and was evaluated in the following standards.

A+: Scratch marks were not observed after a 4H test.
A: Scratch marks were not observed after a 3H test.
B: Scratch marks were not observed after a 2H test.
C: Scratch marks were not observed after an H test.
D: Scratch marks were observed after an H test and were problematic.

(Steel Wool Scratch Resistance Evaluation)

The surfaces of the transparent films were subjected to a rubbing test by using a rubbing tester under the following conditions, so as to obtain indexes of scratch resistance.

Evaluation environment condition: 25° C., relative humidity 60% Rubbing material: Steel wool (manufactured by Nippon Steel Wool Co., Ltd., Grade No. 0000)

Wound on a scrubbing tip portion (1 cm×1 cm) of the tester coming into contact with the specimens, and fastened by a band
Travel distance (one way): 13 cm,
Scrubbing speed: 13 cm/second,
Load: 350 g/cm$^2$,
Tip portion contact area: 1 cm×1 cm,
Number of times of scrubbing: 10 round trips Oily black ink was applied to back sides of the specimens after scrubbing, the specimens were visually observed with reflected light, and scratches on the scrubbed portions were evaluated.

A: Even though the specimens were extremely carefully observed, no scratches were seen.
B: Weak scratches were seen in a case where the specimens were carefully observed but were not problematic.
C: There were scratches that were able to be easily recognized and extremely conspicuous.

(Steel Wool Scratch Resistance Evaluation 500 gf)

The surfaces of the transparent films were subjected to a rubbing test by using a rubbing tester under the following conditions, so as to obtain indexes of scratch resistance.

Evaluation Environment condition: 25° C., relative humidity 60%
Scrubbing material: Steel wool (manufactured by Nippon Steel Wool Co., Ltd., Grade No. 0000)

Wound on a scrubbing tip portion (1 cm×1 cm) of the tester coming into contact with the specimens, and fastened by a band Travel distance (one way): 13 cm,
Scrubbing speed: 13 cm/second,
Load: 500 g/cm$^2$,
Tip portion contact area: 1 cm×1 cm,
Number of times of scrubbing: 10 round trips Oily black ink was applied to back sides of the specimens after scrubbing, the specimens were visually observed with reflected light, and scratches on the scrubbed portions were evaluated.

A: Even though the specimens were extremely carefully observed, no scratches were seen.

B: Weak scratches were seen in a case where the specimens were carefully observed but were not problematic.

C: There were scratches that were able to be easily recognized and extremely conspicuous.

(Steel Wool Scratch Resistance Evaluation 1 Kgf)

The surfaces of the transparent films were subjected to a rubbing test by using a rubbing tester under the following conditions, so as to obtain indexes of scratch resistance.

Evaluation Environment condition: 25° C., relative humidity 60%

C: Scratches were not produced even though rubbing 10 times, but scratches were not produced while rubbing was performed 100 times and more than 10 times.

D: Scratches were produced while rubbing was performed 10 times.

(Haze)

Haze was measured by using a haze meter (NDH 2000 manufactured by Nippon Denshoku Industries Co., Ltd.). With respect to the measurement, the measurement was performed based on JIS-K7136 (2000).

Haze was 1.0% or less: Highly transparent, and thus preferable.

Haze was greater than 1.0% and 2.0% or less: There was slight cloudiness, but there was no problem in appearance.

Haze was greater than 2.0%: There was cloudiness, but appearance of a transparent film was damaged.

(Average Distance Between Fine Particles)

The average distance of the fine particles was observed by using a scanning electron microscope (SEM: S4300 manufactured by Hitachi High-Technologies Corporation) under the condition of an accelerating voltage of 10 kV and was calculated as an average value in a case where distances between end portions of adjacent fine particles were measured at 500 points or more.

TABLE 7

| Name of specimen | Example C-1 | Example C-2 | Example C-3 | Example C-4 | Example C-5 | Example C-6 | Example C-7 | Comparative Example C-8 |
|---|---|---|---|---|---|---|---|---|
| Haze [%] | 0.9 | 0.9 | 0.6 | 0.6 | 0.6 | 0.6 | 0.6 | 0.5 |
| The number of times of folding endurance [times] | 1,100,000 | 1,050,000 | 1,700,000 | 130,000 | 120,000 | 110,000 | 1,700,000 | 150,000 |
| Scratch resistance (Steel wool rubbing 350 gf) | A | A | B | A | A | A | A | C |

Scrubbing material: Steel wool (manufactured by Nippon Steel Wool Co., Ltd., Grade No. 0000)

Wound on a scrubbing tip portion (1 cm×1 cm) of the tester coming into contact with the specimens, and fastened by a band Travel distance (one way): 13 cm,
Scrubbing speed: 13 cm/second,
Load: 1 kg/cm$^2$,
Tip portion contact area: 1 cm×1 cm, Oily black ink was applied to back sides of the specimens after scrubbing, the specimens were visually observed with reflected light, and the number of times of rubbing in a case where scratches appeared on portions coming into contact with the steel wool were measured and evaluated according to the following standards.

A: Even though rubbing was performed 1,000 times, no scratches were produced.

B: Scratches were not produced even though rubbing was performed 100 times, but scratches were not produced while rubbing was performed 1,000 times and more than 100 times.

As presented in Table 7, it was understood that, in the specimens of the present invention, the haze was extremely low, the excellent folding endurance was maintained, and the number of times of folding endurance and the steel wool scratch resistance were extremely excellent.

TABLE 8

|  | Example | Example | Example | Example |
|---|---|---|---|---|
| Name of specimen | C-3 | C-4 | C-6 | C-7 |
| Pencil hardness | B | B | A | B |

As presented in Table 8, the specimens of the present invention were evaluated to be excellent in the pencil hardness test. Particularly, in Example Specimen C-6, the effect obtained by providing the relaxation layer was added, and the evaluation was particularly excellent.

TABLE 9

| Name of specimen | Example C-1 | Example E-1 | Example E-2 | Example E-3 | Example E-4 | Example E-5 | Example E-6 | Example E-7 |
|---|---|---|---|---|---|---|---|---|
| Haze [%] | 0.9 | 0.7 | 0.8 | 1.6 | 0.5 | 0.8 | 0.5 | 1.9 |
| The number of times of folding endurance [times] | 1,100,000 | 1,000,000 | 500,000 | 1,000,000 | 1,000,000 | 1,000,000 | 1,600,000 | 8,000 |
| Scratch resistance Steel wool rubbing 500 gf | B | B | A | A | A | A | A | A |
| Pencil hardness (Immediately afterwards) | C | C | B | B | B | A | B | A+ |

| Name of specimen | Example E-8 | Example E-9 | Comparative Example E-10 | Comparative Example E-11 | Example E-12 | Example E-13 | Comparative Example E-14 | Comparative Example E-15 |
|---|---|---|---|---|---|---|---|---|
| Haze [%] | 1.4 | 1.5 | 0.3 | 0.3 | 0.7 | 0.9 | 0.5 | 1.1 |
| The number of times of folding endurance [times] | 9,000 | 10,000 | 9,000 | 1,400,000 | 1,100,000 | 900,000 | 1,200,000 | 500,000 |
| Scratch resistance Steel wool rubbing 500 gf | A | A | C | C | A | A | C | C |
| Pencil hardness (Immediately afterwards) | A | A+ | D | A | A | A+ | C | C |

| Name of specimen | Comparative Example E-16 | Example E-17 | Example E-18 | Example E-19 | Example E-20 | Example E-21 |
|---|---|---|---|---|---|---|
| Haze [%] | 0.9 | 1.5 | 0.2 | 1.2 | 0.5 | 1.5 |
| The number of times of folding endurance [times] | 1,000,000 | 500,000 | 1,500,000 | 800,000 | 1,200,000 | 700,000 |
| Scratch resistance Steel wool rubbing 500 gf | C | A | A | A | B | A |
| Pencil hardness (Immediately afterwards) | D | C | B | A+ | A | A+ |

As presented in Table 9, it was understood that, in the specimens of the present invention, both the folding endurance, the scratch resistance, and the pencil hardness were compatible with each other, the haze is low, and the specimens were excellent.

TABLE 10

| Name of specimen | Example F-1 | Example F-2 | Comparative Example F-3 | Comparative Example F-4 | Comparative Example F-5 |
|---|---|---|---|---|---|
| Haze [%] | 0.2 | 0.2 | 0.2 | 0.2 | 0.2 |
| The number of times of folding endurance [times] | 3,000 | 1,000 | 500 | 9,000 | 9,000 |
| Scratch resistance Steel wool rubbing 1,000 gf | A | B | C | C | C |
| Pencil hardness (Immediately afterwards) | A+ | A+ | A+ | B | A |

As presented in Table 10, it was understood that, in the examples of the present invention, in addition to folding endurance, in particular, both of the scratch resistance and the pencil hardness were compatible with each other, haze was low, and the specimens were excellent.

Example 2

[Producing Coating Liquid]
(Synthesizing Silica Particles p-1)

67.54 kg of methyl alcohol and 26.33 kg of 28 mass % ammonia water (water and catalyst) were introduced to a reactor having a volume of 200 L provided with a stirrer, a dropping device, and a thermometer, and the liquid temperature was adjusted to 33° C. Meanwhile, a solution obtained by dissolving 12.70 kg of tetramethoxysilane in 5.59 kg of methyl alcohol was introduced to the dropping device. While the liquid temperature in the reactor was maintained at 33° C., the above solution was added dropwise from the dropping device over one hour. After completion of the dropwise addition, stirring was continued for one hour while the temperature were maintained at the above temperature, such that hydrolysis and condensation of tetramethoxysilane were performed and a dispersion liquid containing the silica particle precursor was obtained. This dispersion liquid was air-dried under the conditions of a heating tube temperature of 175° C. and a reduced pressure degree of 200 torr (27 kPa) by using an instantaneous vacuum evaporator (Clarks system CVX-8B model manufactured by Hosokawa Micron Corporation), so as to obtain Silica Particles a-1. The average particle diameter was 200 nm, and the dispersion degree (Cv value) of the particle diameter was 3.5%.

5 kg of Silica Particles a-1 was put into in a crucible, was calcined at 900° C. for one hour by using an electric furnace, was cooled, and was pulverized by using a pulverizer so as to obtain calcined silica particles before classification. Disintegration and classification were performed by using a jet pulverization classifier (IDS-2 type manufactured by Nippon Pneumatic Mfg. Co., Ltd.) so as to obtain Calcined Silica Particles p-1. The average particle diameter of the obtained silica particles was 200 nm, and the dispersion degree (Cv value) of the particle diameter was 3.5%.

(Preparation of Scratch Resistant Fine Particle Layer Coating Liquid)

Each of the components was put into a mixing tank so as to have the composition of Table 11, was stirred for 60 minutes, was dispersed by an ultrasonic disperser for 30 minutes, and was filtrated with a polypropylene filter having a pore size of 5 μm so as to obtain a fine particle layer coating liquid. In Table 11, the urethane-based acrylate polymer was a polymer obtained by introducing a polymerizable group to SANRETAN TIM-2011A (manufactured by Sanyo Chemical Industries, Ltd.), and the photopolymerization initiator was IRGACURE 127.

In Table 11, a numerical value of each of the components refers to an added amount (parts by mass). The unit of the coating liquid concentration (solid content concentration) is "mass %". With respect to the fine particles, indentation hardness, an average primary particle diameter, and a dispersion degree Cv value of the average primary particle diameter are presented.

TABLE 11

| Name of fine particle layer coating composition | | | A-21 | A-22 | A-23 |
|---|---|---|---|---|---|
| Fine particle layer coating composition | Particles | Calcined Silica Particles P-1 (Indentation hardness = 400 MPa, 200 nm, Cv value = 3.5%) | | | 360 |
| | | DENKA ASFP-20 (Indentation hardness = 3,800 MPa, 200 nm, Cv value = 20%) | 90 | 72 | |
| | Binder resin | Urethane-based acylate polymer | 792 | 810 | 522 |
| | Others | Photopolymerization initiator | 18 | 18 | 18 |
| | | Ethanol | 540 | 540 | 540 |
| | | MEK | 60 | 60 | 60 |
| | | Solid content concentration | 60% | 60% | 60% |

(Adjusting Fine Particle Dispersion Liquids D11 to D14)
(Production of Dispersion Liquid D11)

200 parts by mass of ethanol, 50 parts by mass of DENKA ASFP-20 (manufactured by Denki Kagaku Kogyo Kabushiki Kaisha), and 600 g of zirconia beads having a diameter of 0.5 mm (YTZ ball manufactured by Nikkato Co., Ltd.) were placed in a 480 ml container, and paint conditioners (Nishiyama Seisakusho Co., Ltd.) for three hours at 50 Hz. Thereafter, 200 parts by mass of the liquid from which the zirconia beads were removed by performing filtration with a tetoron mesh sheet T-No. 200T manufactured by atflon Co. Ltd. was put into a mixing tank and was stirred for 10 minutes. Thereafter, ultrasonic dispersion was performed for 30 minutes while stirring was continued so as to obtain Dispersion Liquid D11.

(Production of Dispersion Liquid D12)

Dispersion Liquid D12 was obtained in the same manner as Dispersion Liquid D11, except for using 49 parts by mass of DENKA ASFP-20 (manufactured by Denki Kagaku Kogyo Kabushiki Kaisha) and 1 part by mass of 2,3-dihydroxynaphthalene (manufactured by Tokyo Chemical Industry Co., Ltd.) instead of 50 parts by mass of DENKA ASFP-20 (manufactured by Denki Kagaku Kogyo Kabushiki Kaisha) in the production of Dispersion Liquid D11.

(Production of Dispersion Liquid D13)

Dispersion Liquid D13 was obtained in the same manner as Dispersion Liquid D12 except for using cyclohexanone instead of ethanol, in the production of Dispersion Liquid D12.

(Production of Dispersion Liquid D14)

Dispersion Liquid D14 was obtained in the same manner as Dispersion Liquid D12, except for using cyclohexanone instead of ethanol and 49 parts by mass of AA-04 (average primary particle diameter: 400 nm, indentation hardness: 3800 MPa, manufactured by Sumitomo Chemical Company Limited) instead of DENKA ASFP-20 (manufactured by Denki Kagaku Kogyo Kabushiki Kaisha) in the production of Dispersion Liquid D12.

(Preparation 2 of Scratch Resistant Fine Particle Layer Coating Liquid)

Each of the components was put into a mixing tank so as to have the composition of Table 12, was stirred for 60 minutes, was dispersed by an ultrasonic disperser for 30 minutes, and was filtrated with a polypropylene filter having a pore size of 5 μm so as to obtain Scratch resistant Fine Particle Layer Coating Liquids HC21 to HC28. The numerical values in Table 12 represent parts by mass.

TABLE 12

|  | HC21 | HC22 | HC23 | HC24 | HC25 | HC26 | HC27 | HC28 |
|---|---|---|---|---|---|---|---|---|
| DPHA | 28.9 | 28.8 | 28.9 | 28.9 | 21.7 | 29.2 | 11.7 | 28.9 |
| X-12-1048 | 19.3 | 19.2 | 19.3 | 19.3 | 14.5 | — | — | 19.3 |
| SPBDA-S30 | — | — | — | — | — | 19.5 | — | — |
| Urethane acrylate | — | — | — | — | — | — | 25.2 | — |
| Methyl isobutyl ketone | — | — | — | 19.7 | 32.4 | 19.7 | 50.5 | 49.3 |
| Ethanol | 7.8 | 7.8 | 7.8 | — | — | — | — | — |
| Methyl ethyl ketone | 4.6 | 3.1 | 4.0 | — | — | — | — | — |
| Acetone | 7.8 | 7.8 | 7.8 | — | — | — | — | — |
| IRGACURE 127 | 2.0 | 2.0 | 2.0 | 2.0 | 1.5 | 2.0 | 0.8 | 2.0 |
| M1245 | 0.5 | 0.5 | 0.5 | 0.5 | 0.4 | — | — | 0.5 |
| Dispersion Liquid D11 | 29.0 | 29.0 | — | — | — | — | — | — |
| Dispersion Liquid D12 | — | — | 29.6 | — | — | — | — | — |
| Dispersion Liquid D13 | — | — | — | 29.6 | — | 29.6 | 11.8 | — |
| Dispersion Liquid D14 | — | — | — | — | 29.6 | — | — | — |
| RS-90 | — | 1.7 | — | — | — | — | — | — |

DPHA: KAYARAD DPHA, Nippon Kayaku Co., Ltd.

X-12-1048: Shin-Etsu Chemical Co., Ltd.

SPBDA-S30: Osaka Organic Chemical Industry Co., Ltd., Hydrogenated polybutadiene terminal diacrylate Urethane acrylate: Polymer obtained by introducing a polymerizable group to SANRETAN TIM-2011A (manufactured by Sanyo Chemical Industries, Ltd.) manufactured by Sanyo Chemical Industries, Ltd., Concentration 31 weight %

IRGACURE 127: Photopolymerization initiator manufactured by BASF SE

M1245: Tokyo Chemical Industry Co., Ltd., Photoacid generator

RS-90: MEGAFACE RS-90 DIC Corporation

[Production of Transparent Films C-21, C-23 to C-25, and C-27 to C-28] The base material film (PET40) was coated with Scratch resistant Fine Particle Layer Coating Liquid A-21 by using a gravure coater, was dried at 60° C., and was cured by irradiation with an air-cooled metal halide lamp, so as to produce Transparent Film C-21. The film thickness of the fine particle layer was 0.8 μm.

Transparent Films C-23 to C-25, and C-27 to C-28 were produced in the same method as Transparent Film C-21 except for adjusting film thicknesses by using base material films (PET40, S-1, or S-3) or Scratch resistant Fine Particle Layer Coating Liquids A-21 to A-23 as presented in Table 13.

[Production of Transparent Films C-22 and C-26]

The base material film (PET40 or S-1) was coated with Relaxation Layer Coating Liquid B-1 prepared in <Example 1> by using a gravure coater, was dried at 60° C., and was half-cured by irradiation with an air-cooled metal halide lamp. Scratch resistant Fine Particle Layer Coating Liquid A-21 was applied thereto by using a gravure coater, was dried at 60° C., and was cured by irradiation with an air-cooled metal halide lamp, so as to produce Transparent Film C-22. The film thickness of the relaxation layer was 5.0 μm, and the film thickness of the fine particle layer was 0.8 μm.

Transparent Film C-26 was produced in the same method as Transparent Film C-22 except for using Base Material Film S-1 as the base material.

TABLE 13

| Name of specimen | | Example C-21 | Example C-22 | Reference Example C-23 | Example C-24 | Example C-25 | Example C-26 | Example C-27 | Comparative Example C-28 |
|---|---|---|---|---|---|---|---|---|---|
| Name of fine particle layer coating composition | | A-21 | A-21 | A-22 | A-21 | A-23 | A-21 | A-23 | — |
| Name of relaxation layer coating liquid | | — | B-1 | — | — | — | B-1 | — | — |
| Base material | | PET40 | PET40 | PET40 | S-1 | S-1 | S-1 | S-3 | S-1 |
| Film evaluation | Fine particle layer film thickness | 0.8 μm | 0.8 μm | 3.5 μm | 0.8 μm | 0.2 μm | 0.8 μm | 0.2 μm | 0 |
| | Interparticle average distance | 1.6 μm | 1.6 μm | 12 μm | 1.6 μm | 0.3 μm | 1.6 μm | 0.3 μm | — |
| | Fine particle layer indentation hardness [MPa] | 305 | 310 | 300 | 305 | 300 | 310 | 305 | 240 |

TABLE 13-continued

| Name of specimen | Example C-21 | Example C-22 | Reference Example C-23 | Example C-24 | Example C-25 | Example C-26 | Example C-27 | Comparative Example C-28 |
|---|---|---|---|---|---|---|---|---|
| Fine particle volume fraction | 50% | 50% | 30% | 50% | 70% | 50% | 70% | — |

[Production of Transparent Films E-31 to E-41]

(Production of Transparent Films E-31 to E-37, and E-39 to E-41)

Transparent Films E-31 to E-37, and E-39 to E-41 were produced by combining the base material and the scratch resistant fine particle layer coating liquid as presented in Table 14. The base materials were coated with a scratch resistant fine particle layer coating liquid by using a gravure coater at 2.8 ml/m², was dried at 60° C., was cured by irradiation with an air-cooled metal halide lamp, so as to produce transparent films. The film thicknesses of the scratch resistant fine particle layers are presented in Table 14. The base material PET40 was coated with a scratch resistant fine particle layer coating liquid on a surface coated with Easy Adhesive Layer Coating Liquid H1 on a hard coat layer side disclosed in JP2014-209162A.

(Production of Transparent Film E-38)

Scratch resistant Fine Particle Layer Coating Liquid HC27 was applied to a S-4 base material by using a gravure coater at 7.0 ml/m², was dried at 60° C., and was cured by irradiation with an air-cooled metal halide lamp, so as to produce a transparent film. The film thickness of the fine particle layer was 0.8 μm.

(Pencil Hardness Test)

Evaluation was performed in the same manner as in <Example 1>.

(Pencil Hardness Test <Immediately Afterwards>)

Evaluation was performed in the same manner as in <Example 1>.

(Steel Wool Scratch Resistance Evaluation 250 gf)

The surface of the transparent film was rubbed with a rubbing tester under the following conditions so as to obtain an index of scratch resistance.

Evaluation Environment condition: 25° C., 60% RH

Scrubbing material: Steel wool (manufactured by Nippon Steel Wool Co., Ltd., Grade No. 0000)

Wound on a scrubbing tip portion (1 cm×1 cm) of the tester coming into contact with the specimens, and fastened by a band Travel distance (one way): 13 cm, Scrubbing speed: 13 cm/second, Load: 250 g/cm²

Tip portion contact area: 1 cm×1 cm,

Number of times of scrubbing: 10 round trips

TABLE 14

| Name of specimen | Example E-31 | Example E-32 | Example E-33 | Example E-34 | Example E-35 | Example E-36 | Example E-37 | Example E-38 | Example E-39 | Comparative Example E-40 | Comparative Example E-41 |
|---|---|---|---|---|---|---|---|---|---|---|---|
| Base material | PET40 | PET40 | PET40 | PET40 | PET40 | S-4 | S-4 | S-4 | S-4 | PET40 | S-4 |
| Fine particle layer coating liquid | HC21 | HC22 | HC23 | HC24 | HC25 | HC24 | HC26 | HC27 | HC25 | HC28 | HC28 |
| Fine particle layer film thickness | 0.8 μm | 0.8 μm | 0.8 μm | 0.8 μm | 0.6 μm | 0.8 μm | 0.8 μm | 0.8 μm | 0.6 μm | 0.8 μm | 0.8 μm |
| Fine particle layer indentation hardness [MPa] | 310 | 340 | 320 | 310 | 330 | 310 | 300 | 320 | 350 | 250 | 240 |
| Interparticle average distance | 4.8 μm | 4.8 μm | 4.8 μm | 4.8 μm | 1.8 μm | 4.8 μm | 4.8 μm | 12 μm | 3.6 μm | — | — |

(Evaluation of Transparent Film)

(The Number of Times of Folding Endurance)

Evaluation was performed in the same manner as in <Example 1>.

Oily black ink was applied to back sides of the specimens after scrubbing, the specimens were visually observed with reflected light, and scratches on the scrubbed portions were evaluated.

A: Even though the specimens were extremely carefully observed, no scratches were seen.

B: Weak scratches were seen in a case where the specimens were carefully observed but were not problematic.

C: There were scratches that were able to be easily recognized and extremely conspicuous.

(Steel Wool Scratch Resistance Evaluation 500 gf)
Evaluation was performed in the same manner as in <Example 1>.

(Haze)
Evaluation was performed in the same manner as in <Example 1>.

TABLE 15

| Name of specimen | Example C-21 | Example C-22 | Example C-23 | Example C-24 | Example C-25 | Example C-26 | Example C-27 | Comparative Example C-28 |
|---|---|---|---|---|---|---|---|---|
| Haze [%] | 0.7 | 0.7 | 0.4 | 0.4 | 0.4 | 0.4 | 0.4 | 0.3 |
| The number of times of folding endurance [times] | 1,100,000 | 1,050,000 | 1,700,000 | 130,000 | 120,000 | 110,000 | 1,700,000 | 150,000 |
| Scratch resistance Steel wool rubbing 250 gf | A | A | B | A | A | A | A | C |

As presented in Table 15, it was understood that, in the specimens of the present invention, the haze was extremely low, the excellent folding endurance was maintained, and the number of times of folding endurance and the steel wool scratch resistance were extremely excellent.

TABLE 16

| Name of specimen | Example C-23 | Example C-24 | Example C-26 | Example C-27 |
|---|---|---|---|---|
| Pencil hardness | B | B | A | B |

As presented in Table 16, the specimens of the present invention were evaluated to be excellent in the pencil hardness test. Particularly, in Example Specimen C-6, the effect obtained by providing the relaxation layer was added, and the evaluation was particularly excellent.

TABLE 17

| Name of specimen | Example C-21 | Example E-31 | Example E-32 | Example E-33 | Example E-34 | Example E-35 |
|---|---|---|---|---|---|---|
| Haze [%] | 0.7 | 0.8 | 0.8 | 1.4 | 0.6 | 0.4 |
| The number of times of folding endurance [times] | 1,100,000 | 1,000,000 | 1,000,000 | 450,000 | 1,200,000 | 1,400,000 |
| Scratch resistance Steel wool rubbing 500 gf | B | B | A | B | B | A |
| Pencil hardness (Immediately afterwards) | B | A | A | A | A | A |

| Name of specimen | Example E-36 | Example E-37 | Example E-38 | Example E-39 | Comparative Example E-40 | Comparative Example E-41 |
|---|---|---|---|---|---|---|
| Haze [%] | 1.5 | 1.7 | 1.6 | 1.3 | 0.3 | 1.2 |
| The number of times of folding endurance [times] | 8,000 | 10,000 | 10,000 | 9,000 | 9,000 | 1,400,000 |

TABLE 17-continued

| Scratch resistance Steel wool rubbing 500 gf | B | B | B | A | C | C |
| Pencil hardness (Immediately afterwards) | A+ | A | A | A+ | D | A |

As presented in Table 17, in the examples of the present invention, folding endurance, scratch resistance, and pencil hardness are all satisfactory, haze was low, and the specimens were excellent.

According to the present invention, it is possible to provide a transparent film which has excellent scratch resistance and excellent resistance to repetitive bending, a transparent film which has excellent pencil hardness and is appropriate for a flexible display, a polarizing plate, and an image displaying device.

The present invention is described in detail with reference to specific embodiments, but it is obvious to a person skilled in the art that various changes and modifications are possible without departing from the idea and the scope of the invention.

The present application is based on Japanese patent application (JP2015-080879) filed on Apr. 10, 2015, Japanese patent application (JP2015-080880) filed on Apr. 10, 2015, Japanese patent application (JP2015-137958) filed on Jul. 9, 2015, Japanese patent application (JP2015-137959) filed on Jul. 9, 2015, and Japanese patent application (JP2016-003865) filed on Jan. 12, 2016, and the contents thereof are incorporated herein as references.

EXPLANATION OF REFERENCES

1: base material
2: scratch resistant fine particle layer
3: fine particles
4: binder resin
5: relaxation layer

What is claimed is:

1. A transparent film comprising:
a base material; and
at least one scratch resistant layer of which indentation hardness is 300 MPa or greater and of which a thickness is 50 to 1,000 nm on an outermost surface of the transparent film at one side or both sides of the base material,
wherein a number of times of folding endurance of the transparent film measured by an MIT testing machine according to Japanese Industrial Standards (JIS) P8115 (2001) is 1,000 times or greater,
wherein the scratch resistant layer comprises fine particles having a polygonal surface,
wherein a thickness of a fine particle of the fine particles is 50% or less of a thickness of the scratch resistant layer, and the particle size of the fine particles is 100 nm to 1,000 nm in a case where the particle size of the fine particles is converted into a diameter of a virtual circle having a smallest area among a plurality of virtual circles which pass through two arbitrary vertices of a projection portion obtained by projecting the polygonal surface of the fine particles in a direction in which a projection area becomes a maximum and includes the projection portion within the virtual circles, and
wherein the fine particles at least exist in an outermost surface area of the transparent film.

2. The transparent film according to claim 1,
wherein the scratch resistant layer comprises the fine particles and a binder resin.

3. The transparent film according to claim 2,
wherein a shortest distance between end portions of the adjacent ones of the fine particles at an outermost surface of the transparent film is 1 nm to 12 µm.

4. The transparent film according to claim 2,
wherein a dispersion degree of an average primary particle diameter of the fine particles is 10% or less.

5. The transparent film according to claim 2, further comprising:
a relaxation layer between the scratch resistant layer and the base material.

6. The transparent film according to claim 1,
wherein the scratch resistant layer comprises the fine particles having indentation hardness of 400 MPa or greater, and a binder resin.

7. The transparent film according to claim 6,
wherein a shortest distance between end portions of the adjacent ones of the fine particles at an outermost surface of the transparent film is 1 nm to 12 µm.

8. The transparent film according to claim 6,
wherein a thickness of the base material is 50 µm or less, in a case where the fine particle having the polygonal surface is sandwiched between the virtual circle and a virtual plane parallel to the virtual circle and a distance between the virtual circle and the virtual plane is defined as the thickness of the fine particle, the fine particles are unevenly distributed in the outermost surface area of the transparent film, and a ratio of an area occupied by the fine particles to an area of the outermost surface of the transparent film is 30% or greater.

9. The transparent film according to claim 6, further comprising:
a relaxation layer between the scratch resistant layer and the base material.

10. The transparent film according to claim 1,
wherein the scratch resistant layer comprises 80 mass % or greater of a cured product of a cross-linking compound in which a number of crosslinking groups in one molecule is 3 or more with respect to a total mass of the scratch resistant layer, and the transparent film further comprises a relaxation layer between the scratch resistant layer and the base material.

11. The transparent film according to claim 1,
wherein the transparent film has resistance to repetitive bending in which the number of times of folding endurance measured by an MIT testing machine according to JIS P8115 (2001) is 10,000 times or greater.

12. The transparent film according to claim 1, wherein a haze of the transparent film measured based on JIS-K7136 (2000) is 2.0% or less.

13. The transparent film according to claim 1, further comprising:
a relaxation layer between the scratch resistant layer and the base material.

14. The transparent film according to claim 13, wherein indentation hardness of the relaxation layer is smaller than indentation hardness of the scratch resistant layer.

15. A polarizing plate comprising:
the transparent film according to claim 1 on an outermost surface of the polarizing plate.

16. A polarizing plate comprising:
the transparent film according to claim 1 on an outermost surface of the polarizing plate;
a polarizer; and
a transparent base material having resistance to repetitive bending in which a number of times of folding endurance measured by an MIT testing machine according to JIS P8115 (2001) is 1,000 times or greater, on an opposite surface of the polarizing plate so that the transparent film, the polarizer and the transparent base material are provided in this order.

17. An image displaying device comprising:
the transparent film according to claim 1.

18. An image displaying device comprising:
the transparent film according to claim 1 on an outermost surface of the image displaying device on a viewing side; and
a scratch resistant layer which is same as the scratch resistant layer of the transparent film, on an outermost surface of the image displaying device opposite to the viewing side.

19. A transparent film comprising:
a base material; and
at least one scratch resistant layer of which indentation hardness is 300 MPa or greater and of which a thickness is 50 to 1,000 nm on an outermost surface of the transparent film at one side or both sides of the base material,
wherein a number of times of folding endurance of the transparent film measured by an MIT testing machine according to Japanese Industrial Standards (JIS) P8115 (2001) is 1,000 times or greater, and
wherein the scratch resistant layer comprises fine particles of which an average primary particle diameter is 100 nm to 1,000 nm and of which indentation hardness is 400 MPa or greater, and a binder resin, and a thickness of a fine particle of the fine particles is 50% or less of a thickness of the scratch resistant layer.

20. A transparent film comprising:
a base material; and
at least one scratch resistant layer of which indentation hardness is 300 MPa or greater and of which a thickness is 50 to 1,000 nm on an outermost surface of the transparent film at one side or both sides of the base material,
wherein a number of times of folding endurance of the transparent film measured by an MIT testing machine according to Japanese Industrial Standards (JIS) P8115 (2001) is 1,000 times or greater, and
wherein the scratch resistant layer comprises 80 mass % or greater of a cured product of a cross-linking compound in which a number of crosslinking groups in one molecule is 3 or more with respect to a total mass of the scratch resistant layer, and the transparent film further comprises a relaxation layer between the scratch resistant layer and the base material.

* * * * *